(12) United States Patent
Yi et al.

(10) Patent No.: US 12,047,165 B2
(45) Date of Patent: Jul. 23, 2024

(54) SLOT NEGOTIATION METHOD AND DEVICE

(71) Applicant: HUAWEI TECHNOLOGIES CO., LTD., Shenzhen (CN)

(72) Inventors: Ke Yi, Dongguan (CN); Wangqian Li, Dongguan (CN); Yongjian Hu, Dongguan (CN); Xiang He, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 314 days.

(21) Appl. No.: 17/692,810

(22) Filed: Mar. 11, 2022

(65) Prior Publication Data

US 2022/0200722 A1 Jun. 23, 2022

Related U.S. Application Data

(63) Continuation of application No. PCT/CN2020/114221, filed on Sep. 9, 2020.

(30) Foreign Application Priority Data

Sep. 12, 2019 (CN) .......................... 201910867102.6
Oct. 22, 2019 (CN) .......................... 201911008430.7

(51) Int. Cl.
*H04J 3/16* (2006.01)
*H04J 14/02* (2006.01)

(52) U.S. Cl.
CPC ........ *H04J 3/1658* (2013.01); *H04J 14/0227* (2013.01); *H04J 2203/0085* (2013.01)

(58) Field of Classification Search
CPC ................. H04J 3/1658; H04J 14/0227; H04J 2203/0085; H04J 2203/006; H04J 3/14; H04L 45/245; H04L 45/66
See application file for complete search history.

(56) References Cited

U.S. PATENT DOCUMENTS 11,082,332 B2 * 8/2021 Mei ...................... H04L 12/4641
11,570,088 B2 * 1/2023 Mei ...................... H04L 12/4641
(Continued)

FOREIGN PATENT DOCUMENTS

CN 108243120 A 7/2018
CN 108632061 A 10/2018
(Continued)

OTHER PUBLICATIONS

"Calendar Allocation Based on Client Traffic in the Flexible Ethernet Standard"; Liao et al.; ICC 202—2020 IEEE International Conference on Communications (ICC); Date of Conference: Jun. 7-11, 2020; Date Added to IEEE Xplore: Jul. 27, 2020 (Year: 2020).*

(Continued)

*Primary Examiner* — Benjamin H Elliott, IV
(74) *Attorney, Agent, or Firm* — Rimon PC

(57) ABSTRACT

This application relates to a slot negotiation method and a device. The method includes: A transmitter sends a first FlexE overhead frame to a receiver, to request active/standby calendar switching. When the receiver is in a restart state, the receiver does not respond to the received first FlexE overhead frame. In addition, the RX sends a routine update second FlexE overhead frame to the transmitter. Determining that the second FlexE overhead frame is not a response to the first FlexE overhead frame, the transmitter sends a third FlexE overhead frame to request active/standby calendar switching again. According to the method in this application, incorrect calendar switching on the transmitter side caused by a mistaken response of the receiver can be avoided. This reduces the likelihood of a service interruption caused by the existing slot negotiation mechanism.

30 Claims, 17 Drawing Sheets

(56) References Cited

U.S. PATENT DOCUMENTS

| | | | |
|---|---|---|---|
| 11,792,067 B2* | 10/2023 | Li | H04L 41/0631 709/224 |
| 2017/0005901 A1 | 1/2017 | Gareau | |
| 2017/0006360 A1* | 1/2017 | Gareau | H04L 47/41 |
| 2018/0013511 A1* | 1/2018 | Hussain | G02B 6/12033 |
| 2018/0076932 A1* | 3/2018 | Okada | H04L 5/0001 |
| 2018/0152367 A1* | 5/2018 | Gareau | H04L 43/10 |
| 2018/0167160 A1* | 6/2018 | Gareau | H04L 41/00 |
| 2019/0372717 A1* | 12/2019 | Zhang | H04L 1/0061 |
| 2020/0067827 A1* | 2/2020 | Mei | H04J 3/1658 |
| 2020/0252350 A1* | 8/2020 | Gareau | H04L 43/0864 |
| 2020/0358722 A1* | 11/2020 | Gareau | H04L 49/9057 |
| 2021/0091871 A1* | 3/2021 | Deng | H04L 12/2823 |
| 2021/0168058 A1* | 6/2021 | Gareau | H04L 43/10 |
| 2021/0359934 A1* | 11/2021 | Mei | H04J 3/1658 |
| 2021/0377103 A1* | 12/2021 | Li | H04L 41/0677 |
| 2022/0158938 A1* | 5/2022 | Cavaliere | H04L 45/50 |
| 2022/0200722 A1* | 6/2022 | Yi | H04J 3/14 |
| 2022/0231777 A1* | 7/2022 | Zhang | H04J 3/14 |

FOREIGN PATENT DOCUMENTS

| | | |
|---|---|---|
| CN | 109688016 A | 4/2019 |
| CN | 109729588 A | 5/2019 |
| CN | 109962798 A | 7/2019 |
| EP | 3537670 A1 | 9/2019 |
| WO | 2017070851 A1 | 5/2017 |
| WO | 2019128467 A1 | 7/2019 |

OTHER PUBLICATIONS

"On the Efficiency of Flexible Ethernet Client Architectures in Optical Transport Networks [Invited]"; Eira et al.; Journal of Optical Communications and Networking ( vol. 10, Issue: 1, Jan. 2018) (Year: 2018).*

IA OIF-FLEXE-02.0, Jun. 22, 2018, total 51 pages.

IA OIF-FLEXE-01.0, Mar. 2016, total 31 pages.

IA OIF FLEXE-02.1, Jul. 2019, total 56 pages.

* cited by examiner

SLOT NEGOTIATION METHOD AND DEVICE

CROSS-REFERENCE TO RELATED APPLICATIONS

This application is a continuation of International Application No. PCT/CN2020/114221, filed on Sep. 9, 2020, which claims priorities to Chinese Patent Application No. 201910867102.6, filed on Sep. 12, 2019, and Chinese Patent Application No. 201911008430.7, filed on Oct. 22, 2019. All of the aforementioned applications are hereby incorporated by reference in their entireties.

TECHNICAL FIELD

This application relates to the communications field, and in particular, to a slot negotiation method, a device, a system, and a storage medium.

BACKGROUND

Flexible Ethernet (FlexE) technology is an interface technology for implementing service isolation bearing and network slicing on a bearer network. Flexible Ethernet technology has advanced rapidly in the last two years, and is widely accepted by various main standard organizations. The FlexE standard originated from the Optical Internet Forum (OIF) interface physical layer standard, and has features such as flexible bandwidth adjustment, data isolation, and perfect fit for 5G services. FlexE technology introduces a flexible Ethernet protocol layer (which may alternatively be referred to as a FlexE shim layer) on the basis of IEEE 802.3, to decouple the medium access control (MAC) layer from the physical link interface (PHY) layer. In this way, flexible rate matching is implemented. Based on a time division multiplexing (TDM) distribution mechanism, the FlexE shim schedules data of a plurality of FlexE clients and distributes the data to a plurality of different subchannels in a slot manner, to implement hard bandwidth isolation of transmission channels. One service data flow may be allocated to one or more slots, to match services with different rates.

According to the definitions in the current OIF standard, the FlexE shim layer defines an overhead frame (OH Frame) and an overhead multiframe (OH MultiFrame), to represent a slot mapping relationship between a FlexE client and a FlexE group and a working mechanism of a calendar. In the existing FlexE overhead frame slot negotiation mechanism, when a transmit end sends a slot allocation table switching request (which may alternatively be referred to as a slot negotiation request) to a receive end and the receive end resets for some reasons (for example, a device is powered off, a unicast fault of a related service occurs, or a cold reset on a board is triggered because a fault is rectified), the receive end mistakenly responds, and consequently a service from the transmit end to the receive end is interrupted. Therefore, how to effectively avoid the foregoing impact on a FlexE service becomes an urgent problem to be solved.

SUMMARY

This application provides a slot negotiation method, a network device, a communication system, a storage medium, and a computer program product, to solve a traffic interruption caused by a mistaken response of a receive end in the existing FlexE overhead frame slot negotiation mechanism. Technical solutions in this application can improve the accuracy of slot negotiation between network devices, and prevent a service interruption.

According to a first aspect, this application provides a slot negotiation method. The method is performed by a first network device. The method includes: sending a first flexible Ethernet FlexE overhead frame to a second network device, where the first FlexE overhead frame includes first request information, and the first request information is used to request the second network device to switch a standby calendar to an active calendar; receiving a second FlexE overhead frame sent by the second network device; determining, based on first indication information in the second FlexE overhead frame, that the second FlexE overhead frame is not a response to the first request information; and sending a third FlexE overhead frame to the second network device, where the third FlexE overhead frame includes second request information, and the second request information is used to request the second network device to switch the standby calendar to the active calendar.

In the foregoing method, after sending the first FlexE overhead frame used for a slot negotiation request to the second network device, the first network device can determine, based on the first indication information carried in the received second FlexE overhead frame, that the second FlexE overhead frame is not a response to the slot negotiation request sent by the first network device. Therefore, the first network device does not perform active/standby calendar switching. The first network device sends the third FlexE overhead frame used for the slot negotiation request to the second network device again, and requests, by using the second request information carried in the third FlexE overhead frame, the second network device to perform active/standby calendar switching. Therefore, the first network device does not mistakenly identify the second FlexE overhead frame as the response to the slot negotiation request made by the second network device, and does not incorrectly switch a calendar. The foregoing method prevents a service interruption caused by a mis-operation due to the existing slot negotiation mechanism.

In an optional design, the method may further include: receiving a fourth FlexE overhead frame sent by the second network device; and
 determining, based on second indication information carried in the fourth FlexE overhead frame, that the fourth FlexE overhead frame is a response to the second request information.

In an optional design, the method further includes: In response to determining that the fourth FlexE overhead frame is the response to the second request information, the first network device switches the standby calendar to the active calendar.

In an optional design, the method further includes: The first network device sends a fifth FlexE overhead frame to the second network device, to request the second network device to switch the standby calendar to the active calendar.

According to a second aspect, this application provides a slot negotiation method. The method is performed by a second network device. The method includes: receiving a first FlexE overhead frame sent by a first network device, where the first FlexE overhead frame includes first request information, and the first request information is used to request the second network device to switch a standby calendar to an active calendar;
 sending a second FlexE overhead frame to the first network device, where the second FlexE overhead frame includes first indication information, used to indicate that the second FlexE overhead frame is not a response to the first request information; and receiving a third FlexE overhead frame sent by the first network device, where the third FlexE overhead frame includes second request information, and the second request information is used to request the second network device to switch the standby calendar to the active calendar.

In the foregoing method, a flexible Ethernet FlexE overhead frame routinely sent by the second network device to the first network device includes indication information, used to indicate that the flexible Ethernet FlexE overhead frame is not a response to a flexible Ethernet FlexE overhead frame sent by the first network device. Therefore, the first network device can determine, based on the indication information carried in the received second FlexE overhead frame, that the second FlexE overhead frame is not a response to a slot negotiation request sent by the first network device. Therefore, the first network device does not perform active/standby calendar switching. The second network device may receive the third FlexE overhead frame that is sent by the first network device and that is used for the slot negotiation request. In this case, if the second network device is ready to perform active/standby calendar switching, the second network device may perform operations of the active/standby calendar switching based on an indication of the second request information carried in the third FlexE overhead frame. Therefore, the second network device may correctly perform slot negotiation with the first network device. The foregoing method ensures slot negotiation, and prevents a service interruption caused by the existing slot negotiation mechanism.

In an optional design, the method may further include: The second network device sends a fourth FlexE overhead frame to the first network device.

The fourth FlexE overhead frame carries second indication information, and the second indication information is used to indicate that the fourth FlexE overhead frame is a response to the second request information.

In an optional design, the method further includes: The second network device receives a fifth FlexE overhead frame sent by the first network device, and switches the standby calendar to the active calendar based on an indication of the fifth FlexE overhead frame.

In an optional design, the first request information is a first request packet carried over a management channel of the first FlexE overhead frame.

In an optional design, the first request information is information indicated by a CR field and a CCC field carried in the first FlexE overhead frame. A value of the CR field and a value of the CCC field are different.

In an optional design, the first indication information is information indicated by a management channel of the second FlexE overhead frame, and the management channel of the second FlexE overhead frame does not carry a first response packet, where the first response packet is used to indicate that the second FlexE overhead frame is a response to the first request information.

In an optional design, the first indication information is information indicated by a first field in the second FlexE overhead frame, and the first field is different from a calendar switch acknowledgment (CA) field in the second FlexE overhead frame.

In an optional design, the first indication information is information indicated by a calendar switch acknowledgment (CA) field in the second FlexE overhead frame, the first indication information is used to indicate that the second FlexE overhead frame is not a response to the first request information, and the first indication information is not used to indicate a calendar.

In an optional design, the second indication information is information indicated by a management channel of the fourth FlexE overhead frame, the management channel of the fourth FlexE overhead frame carries a second response packet, and the second response packet is used to indicate that the fourth FlexE overhead frame is a response to the second request information.

In an optional design, the second indication information is information indicated by a calendar switch acknowledgment (CA) field in the fourth FlexE overhead frame, the second indication information is used to indicate that the fourth FlexE overhead frame is a response to the second request information, and the second indication information is not used to indicate a calendar.

In an optional design, the second indication information is information indicated by a second field in the fourth FlexE overhead frame, and the second field is different from a calendar switch acknowledgment (CA) field in the fourth FlexE overhead frame.

According to a third aspect, this application provides a first network device, including a transceiver unit and a processing unit. When the first network device performs the method according to any one of the first aspect and optional designs of the first aspect, the transceiver unit is configured to perform a receiving and sending operation, and the processing unit is configured to perform an operation other than receiving and sending. For example, when the first network device performs the method according to the first aspect, the transceiver unit is configured to: send the first flexible Ethernet FlexE overhead frame to the second network device, receive the second FlexE overhead frame sent by the second network device, and send the third FlexE overhead frame to the second network device. The processing unit is configured to determine, based on the first indication information in the second FlexE overhead frame, that the second FlexE overhead frame is not a response to the first request information.

According to a fourth aspect, this application provides a second network device, including a transceiver unit and a processing unit. When the second network device performs the method according to the second aspect and optional designs of the second aspect, the transceiver unit is configured to perform a receiving and sending operation, and the processing unit is configured to perform an operation other than receiving and sending. For example, when the second network device performs the method according to the second aspect, the transceiver unit is configured to: receive the first flexible Ethernet FlexE overhead frame sent by the first network device, send the second FlexE overhead frame to the first network device, and receive the third FlexE overhead frame sent by the first network device. The processing unit is configured to generate the second FlexE overhead frame.

According to a fifth aspect, this application provides a first network device, including a memory and a processor connected to the memory. The memory stores instructions, and the processor reads the instructions, so that the first network device performs the method according to any one of the first aspect and optional designs of the first aspect.

According to a sixth aspect, this application provides a second network device, including a memory and a processor connected to the memory. The memory stores instructions, and the processor reads the instructions, so that the second network device performs the method according to any one of the second aspect and optional designs of second aspect.

According to a seventh aspect, this application provides a first network device, including a communication interface and a processor connected to the communication interface, and through the communication interface and the processor, the first network device is configured to perform the method according to the first aspect and optional designs of the first aspect. The communication interface is configured to perform a receiving and sending operation, and the processor is configured to perform an operation other than receiving and sending. For example, when the first network device performs the method according to the first aspect, the communication interface is configured to: send the first flexible Ethernet FlexE overhead frame to the second network device, receive the second FlexE overhead frame sent by the second network device, and send the third FlexE overhead frame to the second network device. The processor is configured to determine, based on the first indication information in the second FlexE overhead frame, that the second FlexE overhead frame is not a response to the first request information.

According to an eighth aspect, this application provides a second network device, including a communication interface and a processor connected to the communication interface, and through the communication interface and the processor, the second network device is configured to perform the method according to the second aspect and optional designs of the second aspect. The communication interface is configured to perform receiving and sending operations, and the processor is configured to perform operations other than receiving and sending. For example, when the second network device performs the method according to the second aspect, the communication interface is configured to: receive the first flexible Ethernet FlexE overhead frame sent by the first network device, send the second FlexE overhead frame to the first network device, and receive the third FlexE overhead frame sent by the first network device. The processor is configured to generate the second FlexE overhead frame.

According to a ninth aspect, this application provides a communication system, including the first network device according to any one of the third aspect, the fifth aspect, or the seventh aspect, and the second network device according to any one of the fourth aspect, the sixth aspect, or the eighth aspect.

According to a tenth aspect, this application provides a computer-readable storage medium, including computer-readable instructions. When the instructions are run on a computer, the computer performs the method according to any one of the first aspect, the second aspect, possible designs of the first aspect, or possible designs of the second aspect.

According to an eleventh aspect, this application provides a computer program product, including a computer program. When the program runs on a computer, the computer performs the method according to any one of the first aspect, the second aspect, possible designs of the first aspect, or possible designs of the second aspect.

DESCRIPTION OF EMBODIMENTS

Ordinal numbers such as "1", "2", "3", "4", "first", "second", "third", and "fourth" in this application are used to distinguish between different objects, but are not used to limit a sequence of a plurality of objects. In addition, terms "include" and "have" are not exclusive. For example, a process, a method, a system, a product, or a device including a series of steps or units is not limited to the listed steps or units, and may further include steps or units that are not listed.

For the conventional technology related to FlexE in this application, refer to related descriptions of the FlexE standard IA OIF-FLEXE-01.0, IA OIF-FLEXE-02.0, or IA OIF-FLEXE02.1 formulated by the OIF. The foregoing standards are incorporated herein by reference in their entireties.

Figure 1:
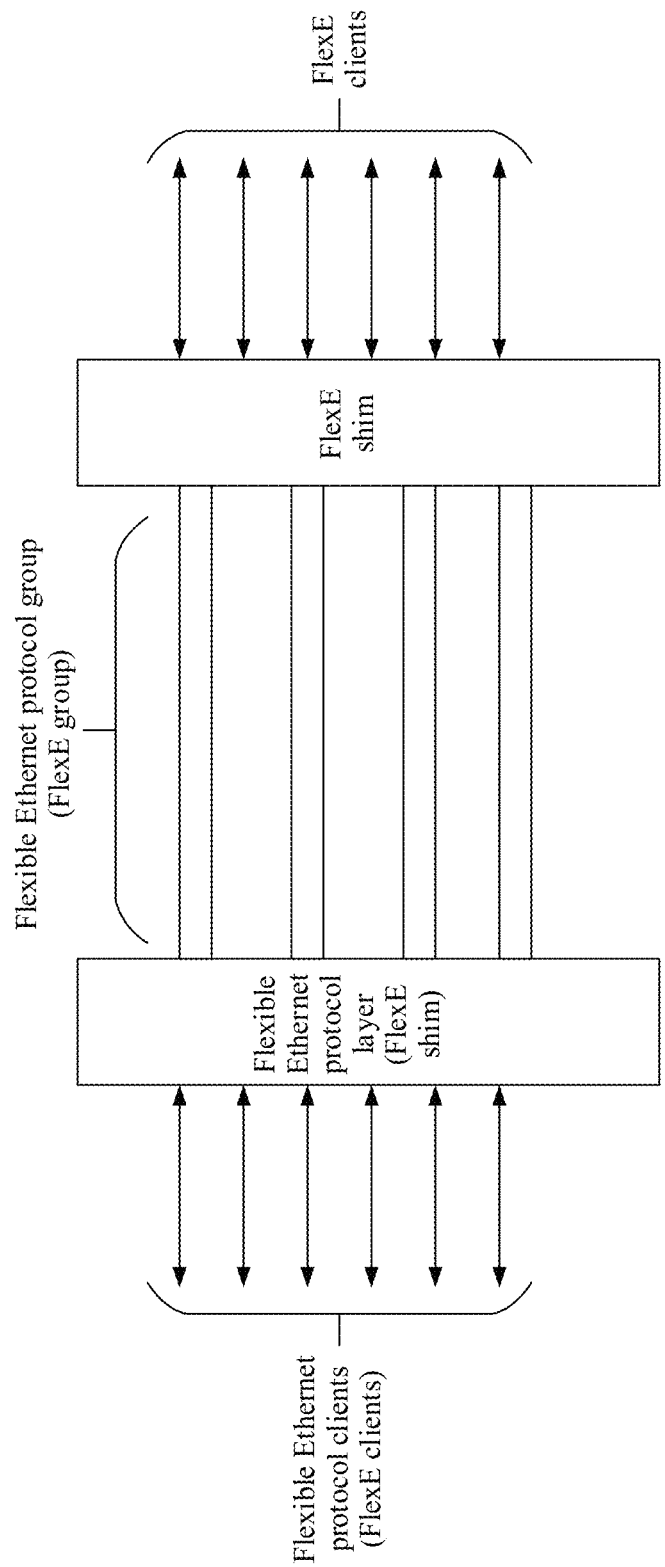
FIG. 1 is a schematic diagram of a FlexE general architecture of based on a flexible Ethernet protocol.

FIG. 1 is an example of a schematic diagram of a FlexE general architecture based on a flexible Ethernet protocol. As shown in FIG. 1, the FlexE group includes four PHYs. A FlexE client represents a client data flow transmitted in a specified slot (one or more slots) in a FlexE group. One FlexE group may carry a plurality of FlexE clients, and one FlexE client may correspond to one or more user service data flows (which may alternatively be referred to as MAC clients). A FlexE shim layer provides data adaptation and conversion from the FlexE client to the MAC client. FlexE may support mapping and transmission of any quantity of different FlexE clients over any group of PHYs, to implement PHY bonding, channelization, sub-rating, and other functions. A plurality of PHYs are bonded into one FlexE group, and the FlexE group is used to carry one or more FlexE client data flows distributed and mapped through the FlexE shim layer. A 100GE PHY is used as an example. The FlexE shim layer may partition each 100GE PHY in the FlexE group into 20-slot (slot) data bearer channels, and a bandwidth corresponding to each slot is 5 Gbit/s.

Figure 2:
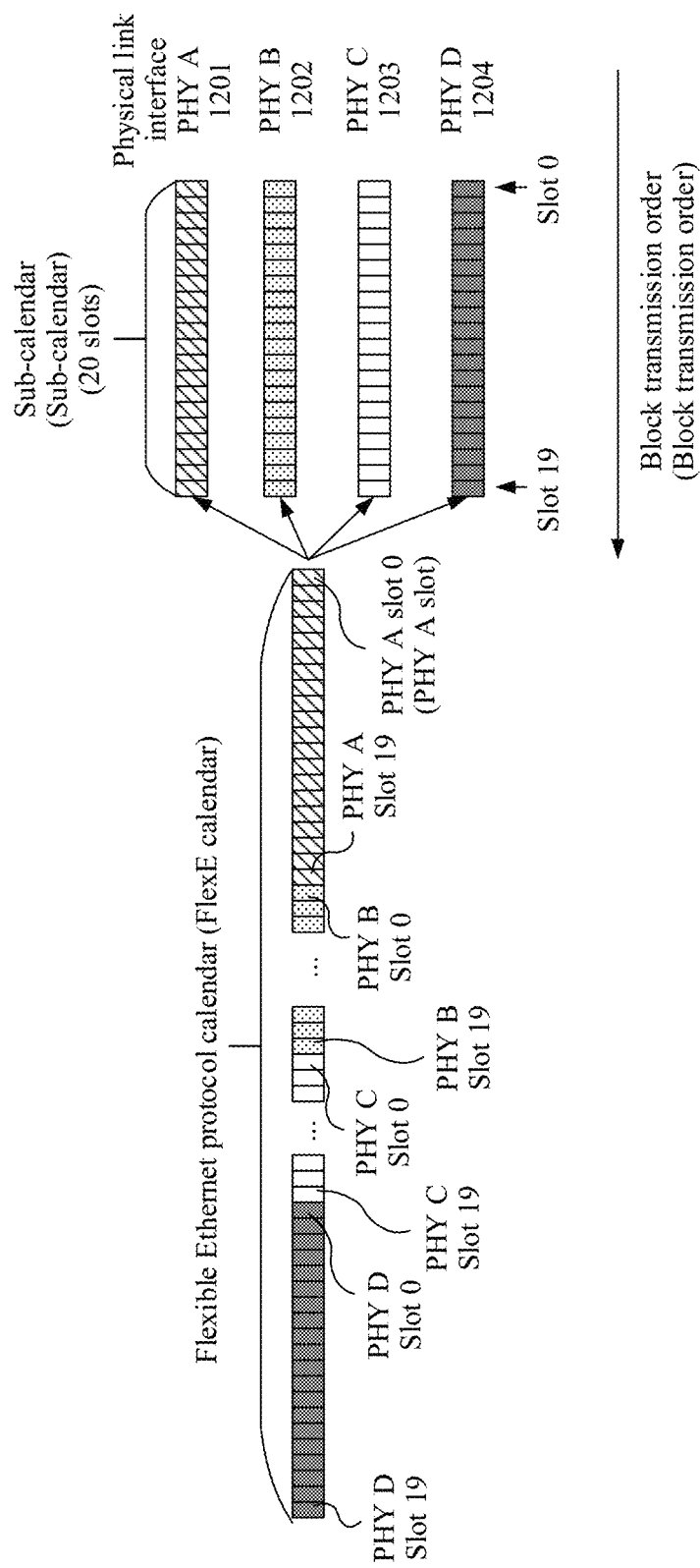
FIG. 2 is a schematic diagram of a slot allocation status of a FlexE group bonding four physical link interfaces (aggregating four PHYs)

FIG. 2 is a schematic diagram of a slot allocation status of a FlexE group bonding four physical link interfaces (aggregating four PHYs). As shown in FIG. 2, each PHY has 20 slots. Therefore, the FlexE group has 20×4 slots. As shown in FIG. 2, an example in which the FlexE group in FIG. 1 includes four PHYs is used for description. The four PHYs are a PHY A 1201, a PHY B 1202, a PHY C 1203, and a PHY D 1204. A slot allocation table (which may alternatively be referred to as a calendar) corresponds to the FlexE group. A slot mapping table corresponding to a single physical link included in one FlexE group may be referred to as a sub-calendar. A FlexE calendar may consist of one or more sub-calendars. Each sub-calendar may indicate how 20 slots (slots) on a single physical link are allocated to corresponding FlexE clients. In other words, each sub-calendar may indicate a correspondence between slots and FlexE clients on the single physical link. As shown in FIG. 2, each PHY may correspond to 20 slots that are represented by slots 0 to 19 in the figure. FIG. 2 is a schematic diagram of 20 slots corresponding to each of the PHY A 1201, the PHY B 1202, the PHY C 1203, and the PHY D 1204.

Figure 3:
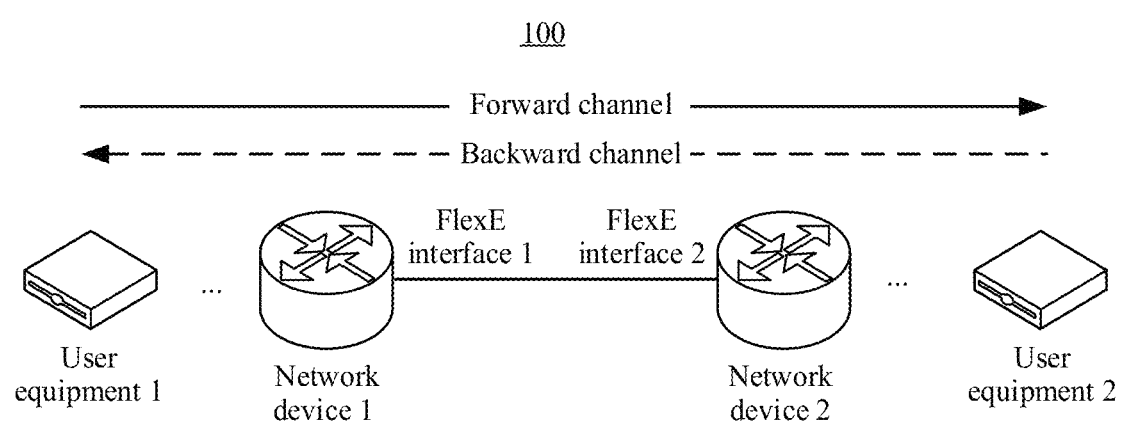
FIG. 3 is a schematic diagram of an application scenario of a FlexE communication system according to this application.

FIG. 3 is a schematic diagram of an application scenario of a FlexE communication system according to this application. As shown in FIG. 3, the FlexE communication system 100 includes a network device 1, a network device 2, user equipment 1, and user equipment 2. The network device 1 may be an intermediate node. In this case, the network device 1 is connected to the user equipment 1 through another network device. The network device 1 may be an edge node. In this case, the network device 1 is directly connected to the user equipment 1. The network device 1 may be an intermediate node. In this case, the network device 1 is connected to the user equipment 1 through another network device. Alternatively, the network device 1 may be an edge node. In this case, the network device 1 is directly connected to the user equipment 1. The network device 2 may be an intermediate node. In this case, the network device 2 is connected to the user equipment 2 through another network device. Alternatively, the network device 2 may be an edge node. In this case, the network device 2 is directly connected to the user equipment 2. The network device 1 includes a FlexE interface 1, and the network device 2 includes a FlexE interface 2. The FlexE interface 1 is adjacent to the FlexE interface 2. Each FlexE interface includes a transmit port and a receive port. A difference from a conventional Ethernet interface lies in that one FlexE interface may carry a plurality of clients, and a FlexE interface used as a logical interface may include a plurality of physical interfaces. A flow direction of service data over a forward channel shown in FIG. 3 is shown by a solid line arrow in FIG. 3, and a flow direction of service data over a backward channel is shown by a dashed line arrow in FIG. 3. A forward channel is used as an example of a transmission channel in the embodiments of the present disclosure. A flow direction of service data over the transmission channel is: the user equipment 1, the network device 1, the network device 2, and the user equipment 2.

It should be understood that FIG. 3 shows only an example of two network devices and two user equipment. The network may include any other quantities of network devices and user equipment. This is not limited in the embodiments of this application. The FlexE communication system shown in FIG. 3 is merely an example for description. An application scenario of the FlexE communication system provided in this application is not limited to the scenario shown in FIG. 3. Technical solutions provided in this application are applicable to all network scenarios in which data transmission is performed by using a FlexE technology.

Figure 4:
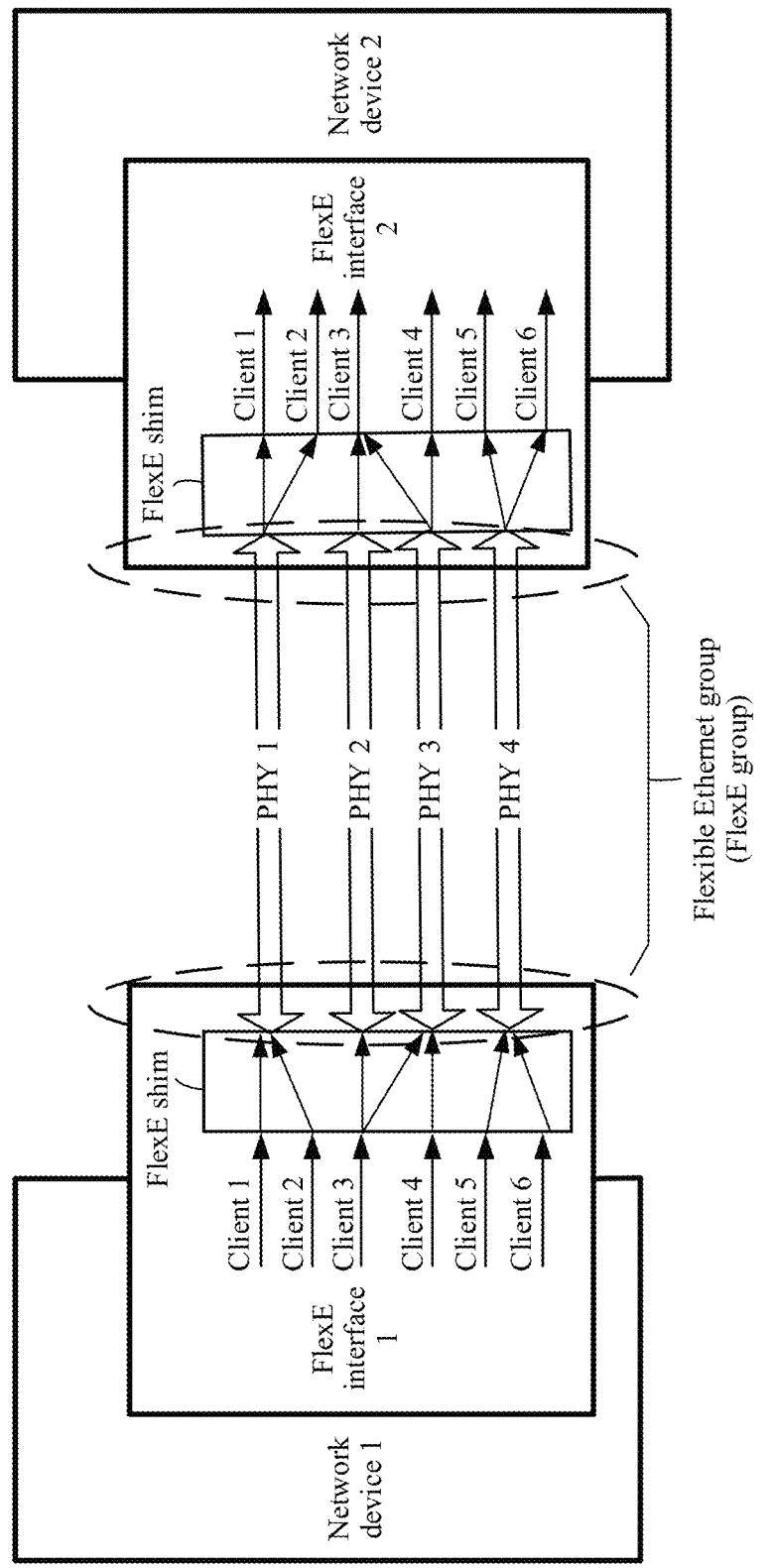
FIG. 4 is a schematic diagram of a procedure for transmitting data by using a FlexE technology according to this application.

With reference to FIG. 4, the following further describes a procedure in which the network device 1 and the network device 2 shown in FIG. 3 transmit data by using the FlexE technology.

As shown in FIG. 4, a PHY 1, a PHY 2, a PHY 3, and a PHY 4 are bonded into a FlexE group. The network device 1 is connected to the network device 2 through FlexE group interfaces: a FlexE interface 1 and a FlexE interface 2. The FlexE group interface may also be referred to as a FlexE interface. The FlexE group interface is a logical interface formed by bonding a group of physical interfaces. The FlexE group interface carries six clients in total: a client 1 to a client 6. Data of the client 1 and the client 2 is mapped to the PHY 1 for transmission. Data of the client 3 is mapped to the PHY 2 and the PHY 3 for transmission. Data of the client 4 is mapped to the PHY 3 for transmission. Data of the client 5 and the client 6 is mapped to the PHY 4 for transmission. It can be learned that different FlexE clients perform mapping and transmission on a FlexE group, to implement a bonding function. The details are as follows:

The FlexE group is also referred to as a bonding group. A plurality of PHYs included in each FlexE group have a logical bonding relationship. The logical bonding relationship means that there may be no physical connection relationship between different PHYs. Therefore, the plurality of PHYs in the FlexE group may be physically independent of each other. A network device in FlexE may identify, by using numbers of PHYs, specific PHYs included in a FlexE group, to implement logical bonding of a plurality of PHYs. For example, each PHY number may be identified by using a number ranging from 1 to 254, and 0 and 255 are reserved numbers. A number of a PHY may correspond to an interface on the network device. Two adjacent network devices need to use a same number to identify a same PHY. Numbers of PHYs included in the FlexE group do not need to be consecutive. Usually, there is one FlexE group between two network devices. However, this application does not limit that there is only one FlexE group between two network devices. In other words, there may be a plurality of FlexE groups between two network devices. One PHY may be used to carry at least one client, and one client may be transmitted on at least one PHY.

The FlexE client corresponds to various user interfaces of a network, and is consistent with a conventional service interface in an existing IP/Ethernet network. The FlexE client may be flexibly configured based on a bandwidth requirement, supports Ethernet MAC data flows of various rates (for example, data flows of 10 Gbit/s, 40 Gbit/s, n×25 Gbit/s, and even non-standard rates), and, for example, may be transmitted to the FlexE shim layer as a 64B/66B encoded data stream. The FlexE client may be interpreted as an Ethernet flow based on a physical address. Clients sent by using a same FlexE group need to share a same clock, and these clients need to perform adaptation based on allocated slot rates.

The FlexE shim is an additional logical layer between the MAC layer and the PHY (PCS sublayer) layer in the conventional Ethernet architecture. It is a core architecture for implementing the FlexE technology through a calendar slot distribution mechanism. A main function of the FlexE shim is to slice data based on a same clock, and encapsulate the sliced data into slots (slots) obtained by partitioning in advance. Then, each slot obtained by partitioning is mapped, based on a preconfigured calendar, to a PHY in the FlexE group for transmission. Each slot is mapped to one PHY in the FlexE group.

The calendar may alternatively be referred to as a slot table. A FlexE group corresponds to a calendar, and a slot mapping table corresponding to a single physical link (PHY) included in one FlexE group may be referred to as a sub-calendar. A FlexE calendar may consist of one or more sub-calendars. Each sub-calendar may indicate how 20 slots on a single physical link are allocated to corresponding FlexE clients. In other words, each sub-calendar may indicate a correspondence between slots and FlexE clients on the single physical link. It is defined in the existing standard that two calendars are specified in each FlexE overhead frame. The two calendars are the current active calendar (calendar A) and the current standby calendar (calendar B).

In the FlexE, a fixed frame format for physical interface transmission is constructed, and TDM slot partitioning is performed. The following uses an existing FlexE frame format as an example for description. A slot partitioning granularity in the FlexE may be 66B, which corresponds to one 64B/66B code block, and each 64/66B code block is carried in one slot. One FlexE frame includes eight rows. The first 64B/66B bit block in each row is a FlexE overhead block. A payload area for slot partitioning follows the overhead block. At a granularity of 66 bits, the payload area corresponds to 20×1023 66-bit bearer spaces. A 100GE interface is used as an example. A bandwidth of the 100GE interface is partitioned into 20 slots. Each slot bandwidth is about 5 Gbit/s, which is referred to as a slot. 64B/66B may be understood as a 64-bit bit block and a 66-bit code block obtained by encoding the 64-bit bit block. The FlexE implements a plurality of transmission channels, that is, implements a plurality of slots, on a single physical interface in an interleaving and multiplexing manner. The FlexE is only an interface technology, and a related switching technology may be performed based on an existing Ethernet packet, or may be performed based on the FlexE in a cross manner. Details are not described herein.

As described above, the FlexE shim layer defines an overhead frame and an overhead multiframe, to implement a calendar working mechanism and a mapping relationship between a client and a slot in the FlexE group. It should be noted that the foregoing overhead frame may alternatively be referred to as a flexible Ethernet overhead frame (FlexE overhead frame), and the foregoing overhead multiframe may alternatively be referred to as a flexible Ethernet overhead multiframe (FlexE overhead Multiframe). The FlexE shim layer provides an inband management channel through overhead, and supports transmission of configuration and management information between two interconnected FlexE interfaces, to establish a link through automatic negotiation.

Data on each PHY of the FlexE is aligned by periodically inserting a code block of a FlexE overhead frame (overhead frame, OH). For example, one 66B overhead code block FlexE OH may be inserted at an interval of 1023×20 66B payload data code blocks. According to the FlexE Implementation Agreement protocol, one FlexE group sends one 64B/66B code block of a FlexE overhead frame to a remote PHY at a preset time interval over each PHY. Eight 64B/66B code blocks of the FlexE overhead frame that are successively sent form one FlexE overhead frame. In the FlexE, it is defined that some fields in the overhead frame carry a calendar, and the calendar is synchronized to a PHY of a remote communication device by using the FlexE overhead frame, to ensure that communication devices at both ends receive and send a data flow corresponding to a FlexE client by using the same calendar. Specifically, one overhead frame has eight overhead blocks, and the overhead block may also be referred to as an overhead slot. The overhead block may be, for example, a code block in 64B/66B coding, and appears once at an interval of 1023×20 blocks, but overhead blocks have different fields.

Figure 5:
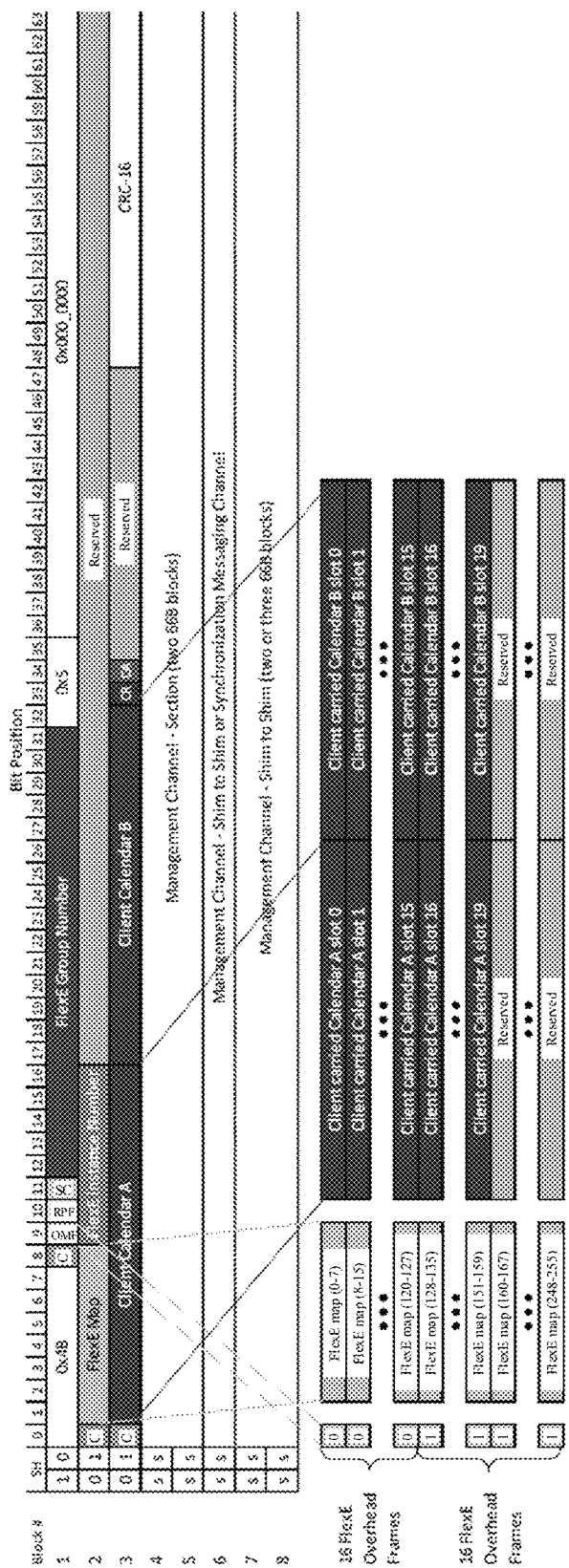
FIG. 5 is a schematic diagram of a structure of an overhead frame and an overhead multiframe of a 100GE interface according to the OIF IA-FLEXE-02.1 standard.

FIG. 5 is a schematic diagram of a structure of an overhead frame and an overhead multiframe of a 100GE interface according to the OIF IA-FLEXE-02.1 standard. The following briefly describes a structure of the FlexE overhead frame (hereinafter referred to as an overhead frame for short) with reference to FIG. 5. As shown in FIG. 5, one overhead frame includes eight overhead blocks. The overhead frame specifies the following bit fields (which may alternatively be referred to as fields) in an overhead block 1 (block 1) to an overhead block 3 (block 3), to guide slot negotiation between communication devices. An overhead block 4 (block 4) to an overhead block 8 (block 8) in the overhead frame are a management channel, and the management channel may be used to carry a 1588 packet, a synchronous Ethernet packet, a DCN packet, a link search packet, and the like. There is no limitation on a type of a packet that can be carried over the management channel, provided that the packet is of an encoding format that can be correctly decoded by the communication device.

The following describes some bit fields related to slot negotiation in the overhead frame shown in FIG. 5.

C: 1 bit, used to indicate the current calendar configuration in use (Calendar configuration in use). The C bit is defined to be at three locations in the overhead frame and to have the same meaning. The bit field is mainly used to ensure reliability. The bit field is represented by a CCC field in the following descriptions. For example, if a value of CCC is 0, it indicates that the current active calendar is the calendar A. If a value of CCC is 1, it indicates that the current active calendar is the calendar B. It should be noted that, in this application, values of the three C bits in the overhead frame are always the same, to be specific, all values are 0 or all values are 1. If the value of CCC is 1, it indicates that the values of the three C bits are all 1. If the value of the CCC is 0, it indicates that the values of the three C bits are all 0.

CR: 1 bit, used to indicate a slot negotiation request. The slot negotiation request may alternatively be referred to as a calendar switch request (Calendar Switch Request). In a routine overhead frame updating procedure between a transmit end device and a receive end device, a value of the CR field is consistent with a value of the CCC field to indicate the current active calendar. After a transmit end initiates a slot negotiation request, a value of the CR field is different from a value of the CCC field, where the value of the CR field points to a standby calendar, and the value of the CCC field points to the current active calendar. A person skilled in the art may understand that the "slot negotiation request"

and the "calendar switch request" may express a same meaning, and the two are often interchangeably used in this application.

CA: 1 bit, used to indicate a calendar switch acknowledgment (Calendar Switch Acknowledge) field. In the existing standard, the CA field has ambiguity in semantics. The field is used to indicate a response of the receive end device (hereinafter referred to as an RX) to a slot negotiation request sent by the transmit end device (hereinafter referred to as a TX), and is used to indicate a calendar. If a value of a CA field carried in an overhead frame sent back by the RX is consistent with a value of a CR field carried in an overhead frame received by the RX sent by the TX, the TX considers that the overhead frame sent back by the RX is a response of the RX to a slot negotiation request sent by the TX and the RX is ready to switch to a calendar indicated by the CA field. The TX switches from the active calendar to the standby calendar, changes a value of a CCC field to a same value of the CR field corresponding to the moment when the slot negotiation request is sent, and sends the CCC field included in the overhead frame to the RX. After receiving the overhead frame in which CR=CCC, the RX also switches from the active calendar to the standby calendar.

Figure 6:
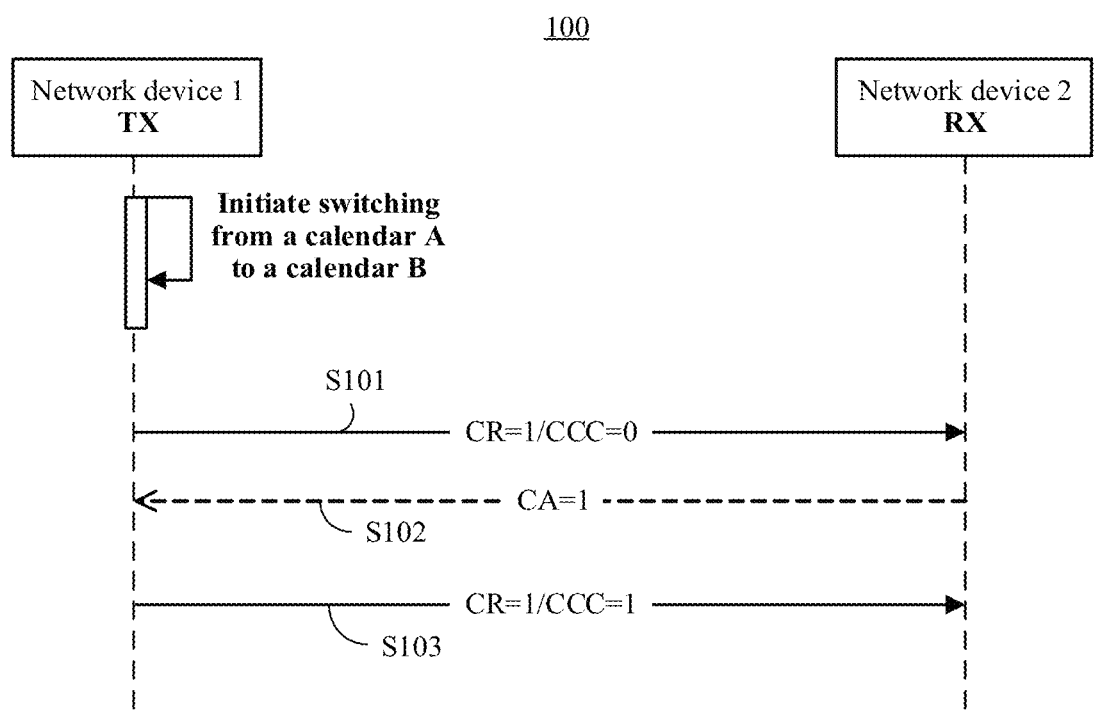
FIG. 6 is a schematic flowchart of a slot negotiation method.

With reference to FIG. 6, the following briefly describes a method 100 for performing slot negotiation between network devices based on the scenario shown in FIG. 3 as an example. For ease of description, in FIG. 6, the network device 1 is identified as the TX, and the network device 2 is identified as the RX. For some reasons, the TX initiates switching from the active slot table calendar A to the standby calendar B. For example, a reason for triggering the switching of the slot table may be:

(a) In the TX, a slot bandwidth of a FlexE client is modified;

(b) In the TX and/or the RX direction, a PHY is added to or deleted from a FlexE group, or a status of a PHY changes; or (c) A device in the TX and/or RX direction is restarting initialization.

To complete slot table switching, the slot negotiation method 100 is performed between the TX and the RX. The method includes the following steps.

S101: The TX initiates a slot negotiation request, and requests the RX to switch the standby calendar to the active calendar. Specifically, the TX sets a CR to the calendar B (CR=1) and a CCC to the calendar A (CCC=0), and sends the slot negotiation request to the RX by using a FlexE overhead frame. The TX waits for the RX to respond with CA information.

S102: The RX direction receives the slot negotiation request (CR=1/CCC=0) of the TX. If the RX direction is ready and received calendar B configuration information is valid, a CA is set to the calendar B (CA=1), and the CA is sent to the TX by using a FlexE overhead frame.

S103: After receiving a slot negotiation response (CA=1) from the RX direction, the TX switches a local active slot table to the calendar B, changes a CCC to the calendar B (CCC=1), and sends the CCC to the RX by using a FlexE overhead frame. After receiving the FlexE overhead (CR=1/CCC=1), the RX also switches a local active slot table to the calendar B.

S101 to S103 describe a complete slot negotiation procedure in a normal case. A procedure in which the TX initiates switching from the calendar B to the calendar A is similar. A person skilled in the art may understand that, after S101, if the TX does not receive a slot negotiation response from the RX for a long time period, the TX periodically sends a slot negotiation request again. Subsequent steps are the same as those in S102 and S103, and details are not described again.

Figure 7:
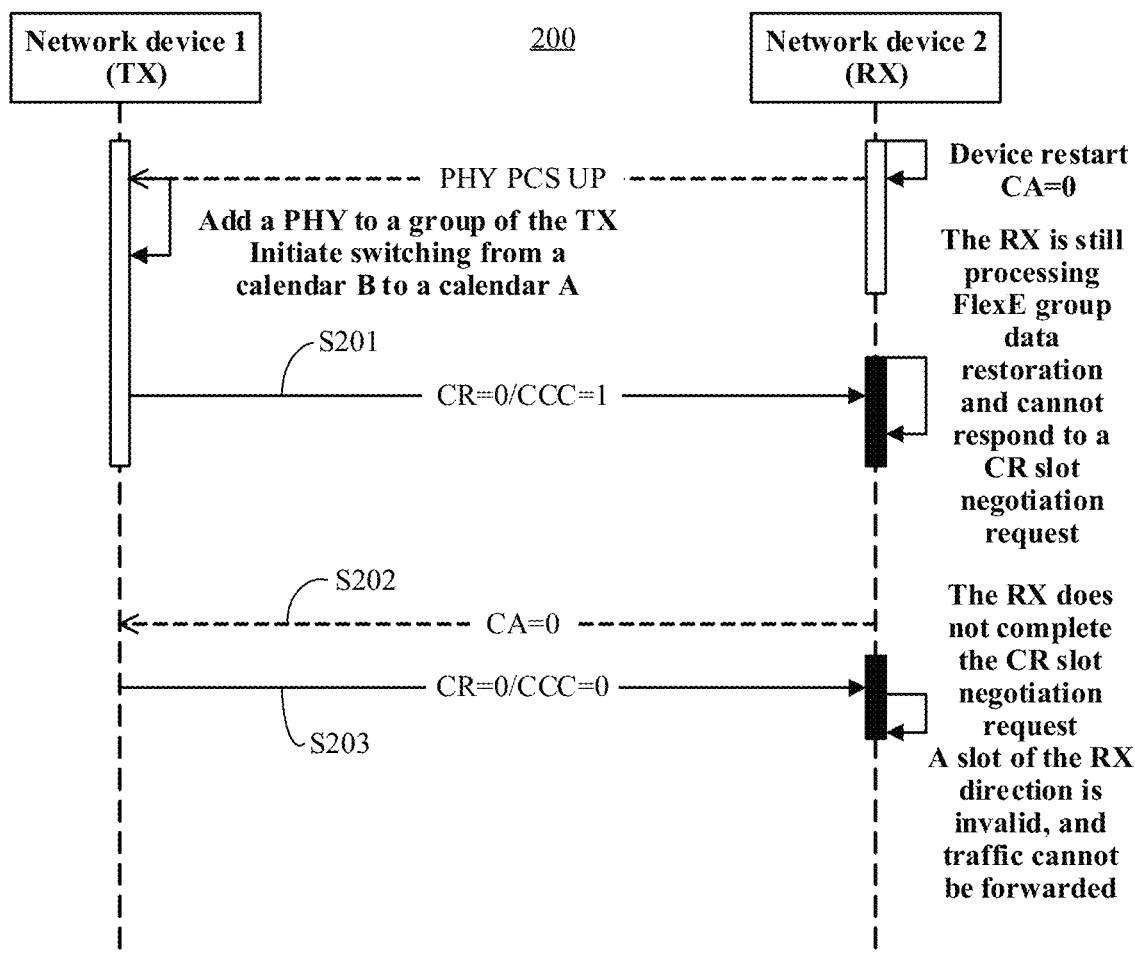
FIG. 7 is a schematic diagram for describing a scenario in which a mistaken response of an RX is caused.

There is a problem of mistaken RX response in the FlexE overhead slot negotiation mechanism described in the foregoing method 100. With reference to FIG. 7, the following describes a scenario that causes the foregoing problem.

In FIG. 7, communication connection is established between the TX and the RX at both ends of the FlexE group. For some reasons (for example, a device is powered off, a related service board is removed and inserted, or a cold reset on a board is triggered by fault self-healing), the RX device is restarted. On the RX side, all negotiation data about the FlexE group is cleared. The active slot table of the RX is the calendar A by default. In this case, values of a CA field, a CR field, and a CCC field in an overhead frame sent by the RX are all 0. On the TX side, the current active calendar of the TX is the calendar B. When a PCS layer of PHYs in the FlexE group is restored to UP during the restart of the RX direction and preparations of the TX are ready, a slot negotiation request is triggered for performing slot negotiation with the RX. The preparations of the TX include:

adding a PHY to a FlexE group: The PHY is added to be under management of a corresponding FlexE group based on a FlexE group number configuration; and updating a TX slot: The TX delivers a slot configuration.

A specific slot negotiation method 200 includes the following steps.

S201: The TX initiates a slot negotiation request, to request calendar switching. The TX sets a CR to the calendar A (CR=0) and a CCC to the calendar B (CCC=1), and sends the slot negotiation request to the RX by using a FlexE overhead frame. The TX waits for the RX direction to respond with CA information.

When the RX direction receives the slot negotiation request, a restart and restoration procedure is still in progress, and related processing data is not prepared. Therefore, preparations of the RX direction are not ready. Therefore, the RX direction does not respond to the slot negotiation request. The preparations of the RX direction include:

adding a PHY to a FlexE group: The PHY is added to be under management of a corresponding FlexE group based on a FlexE group number configuration;

establishing a FlexE group: The RX receives the FlexE overhead frame from the TX, obtains an internal group number and PHY number through parsing, and verifies that the internal group number and PHY number are consistent with a local configuration of the RX, and finally considers that the establishing a FlexE group is successful; and enabling CR interruption: When data of the FlexE group and the PHY is ready, CR interruption is enabled to receive the slot negotiation request of the TX.

The RX direction enables CR interruption to perform the following operations:

(a) If the CR and CCC in the FlexE overhead frame received by the RX direction are inconsistent, the slot negotiation request is considered as a new slot negotiation request;

(b) The RX extracts information about a calendar specified by the CR from the FlexE overhead frame, and configures, based on a FlexE client ID in the calendar, standby calendar information corresponding to a physical MAC; (an active calendar of the physical MAC on the RX side is empty and invalid because the device on the RX side is restarted)

(c) Based on a value of the CR in the received FlexE overhead frame, the RX direction responds to the TX direction with a corresponding CA by using a FlexE overhead frame, and the RX direction waits for a response in which CR=CCC from the TX; and (d) After receiving a FlexE overhead frame in which CR=CCC from the TX, the RX side switches the standby calendar of the physical MAC to be the active calendar.

If the RX does not complete the operations in (a) to (d), slot information of the physical MAC on the RX side is empty or inconsistent with the slot configuration on the TX side, which leads to a traffic interruption.

S202: The RX sends an updated FlexE overhead frame to the TX at a fixed periodic interval.

As described above, after receiving the slot negotiation request sent by the TX, the preparations of the RX direction are not ready, and therefore the RX direction does not make a valid response to the slot negotiation request. However, the RX periodically sends a FlexE overhead frame to the TX. In the FlexE overhead frame that is routinely sent by the RX to the TX, a value of a CA is set to 0 by default. In this case, because a CA that the TX is waiting for and that is in a response from the RX is also 0, the TX mistakenly considers that the FlexE overhead frame routinely sent by the RX is a response to the slot negotiation request sent in S201, and therefore continues to perform S203 described below. If the TX does not need slot negotiation, the TX does not initiate another slot negotiation request. It can be learned that the FlexE overhead frame routinely sent by the RX mistakenly responds to the slot negotiation request sent by the TX.

S203: After receiving the FlexE overhead frame sent by the RX direction, the TX switches the local active slot table to the calendar A because the CA carried in the FlexE overhead frame is 0, changes the CCC to the calendar A (CCC=0), and sends to the RX by using a FlexE overhead frame.

After the RX receives the FlexE overhead frame sent by the TX in S203, even if the RX has made the foregoing preparations, the RX does not actually correctly process the slot negotiation request sent by the TX in S201. Therefore, the RX cannot obtain correct slot information, and therefore traffic from the TX to the RX is interrupted.

It can be learnt that, when the TX and the RX perform slot negotiation, if the device of the RX side is in a restart state for some reasons, the FlexE overhead frame routinely sent by the RX side may mistakenly respond to the slot negotiation request sent by the TX side. Therefore, the TX mistakenly considers that the RX makes a valid response to the slot negotiation request. However, the actual situation is that the TX and the RX do not perform valid slot negotiation. How to avoid the foregoing situation, improve accuracy of slot negotiation, and prevent normal services from being affected becomes a problem to be resolved. To resolve the foregoing problem, this application provides a slot negotiation method 300.

Figure 8:
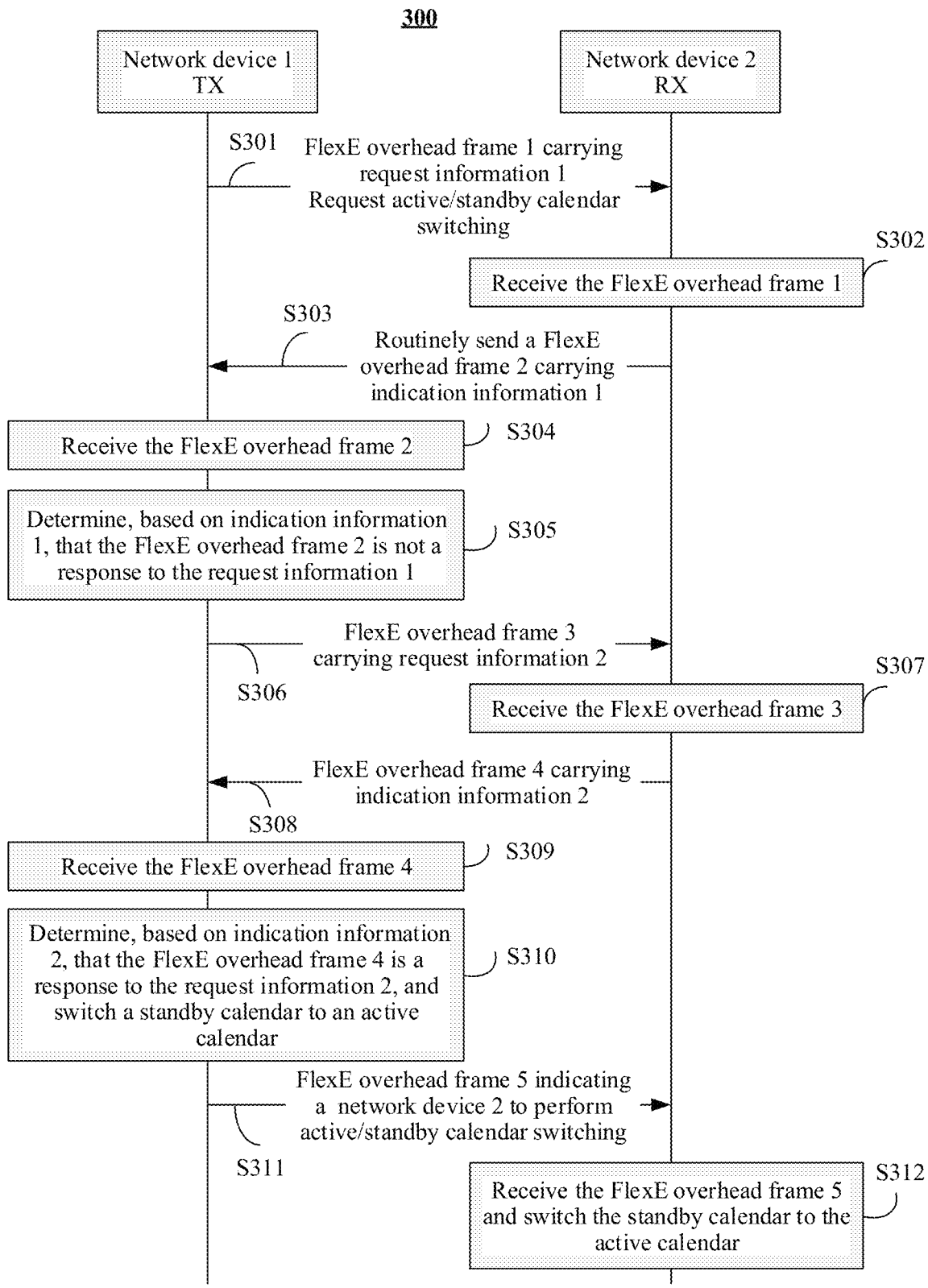
FIG. 8 is a schematic diagram of a slot negotiation method according to this application.

The following describes in detail the method 300 in this embodiment of this application with reference to FIG. 8. A network architecture to which the method 300 is applicable includes a network device 1 and a network device 2. For example, the network device 1 and the network device 2 may be, for example, the network device 1 and the network device 2 shown in FIG. 3. The network device 1 and the network device 2 are connected by using a single PHY, or may be connected by using a FlexE group. The network architecture may be, for example, the network architecture shown in FIG. 3. With reference to FIG. 8, the following describes an example of the method 300 by using the architecture shown in FIG. 3. The method 300 includes the following steps.

S301: The network device 1 sends a FlexE overhead frame 1 to the network device 2.

Specifically, the FlexE overhead frame 1 includes request information 1. The request information 1 is used to request the network device 2 to perform active/standby calendar switching, in other words, to request the network device to switch a standby calendar to an active calendar.

In a specific implementation, the request information 1 is information indicated by a CR field and a CCC field in the FlexE overhead frame 1. For example, a value of the CR field carried in the FlexE overhead frame 1 is 0, and a value of the CCC field is 1. When values of the CR field and the CCC field are different, the FlexE overhead frame 1 is used to send a slot negotiation request 1 that may alternatively be referred to as a calendar switch request 1. When the value of the CCC field is 1, it indicates that the current active calendar is a calendar 1. When the value of the CR field is 0, it indicates that to switch the standby calendar, namely, a calendar 2, to be the current active calendar is requested. When the CR field is 1 and the CCC field is 0, it indicates that to switch from the calendar 2 to the calendar 1 is requested. When the CR field is 0 and the CCC field is 1, it indicates that to switch from the calendar 1 to the calendar 2 is requested. In a specific implementation, according to the current OIF standard, the calendar 1 may be the calendar B defined in the standard, and the calendar 2 is the calendar A defined in the standard.

In a specific implementation, the request information 1 may be a request packet 1 carried over a management channel of a first FlexE overhead frame. The request packet 1 may alternatively be referred to as a slot negotiation request packet 1. For a specific format of the request packet carried over the management channel, refer to specific descriptions in the following with reference to FIG. 12*a* or FIG. 12*c* and FIG. 12*d*. A person skilled in the art may understand that a format of the request packet carried over the management channel is not limited to the example provided in this application. A specific format of the request packet carried over the management channel is not specifically limited in this application.

S302: The network device 2 receives the FlexE overhead frame 1.

When the network device 2 is in a restart state, the network device 2 may perform a discarding operation on the received FlexE overhead frame 1, without performing actual processing.

S303: The network device 2 sends a FlexE overhead frame 2 to the network device 1.

The FlexE overhead frame 2 is a FlexE overhead frame that is routinely sent by the network device 2 to the network device 1 on a basis of a fixed time period. A value of a CA field in the FlexE overhead frame 2 is the same as the value of the CR field in the FlexE overhead frame 1. For example, the value of the CR field carried in the FlexE overhead frame 1 is 0, and the value of the CA field of the FlexE overhead frame 2 is also 0.

S304: The network device 1 receives the FlexE overhead frame 2 sent by the network device 2.

S305: The network device 1 determines, based on indication information 1 carried in the FlexE overhead frame 2, that the FlexE overhead frame 2 is not a response to the request information 1. That the FlexE overhead frame 2 is not the response to the request information 1 also means that the FlexE overhead frame 2 is not a response to the slot negotiation request 1, and is not a response to the FlexE overhead frame 1.

That the network device 1 determines that the FlexE overhead frame 2 is not the response to the request information 1 means that the network device 1 can correctly identify that a received FlexE overhead frame is not a trustworthy response made by the network device 2 to the slot negotiation request 1 sent by the network device 1. Specific descriptions of S305 are described in detail below, and details are not described herein again.

S306: The network device 1 sends a FlexE overhead frame 3 to the network device 2.

Similar to S301, the FlexE overhead frame 3 includes request information 2 that is used to request the network device 2 to perform active/standby calendar switching, in other words, to request the network device 2 to switch the standby calendar to the active calendar. A specific format of the request information 2 is the same as that of the request information 1, and a difference lies in that the request information 2 is carried in a different FlexE overhead frame. Therefore, for descriptions of the request information 2, refer to the foregoing descriptions of the request information 1. Details are not described herein again.

A value of a CR field carried in the FlexE overhead frame 3 is 0, and a value of a CCC field carried in the FlexE overhead frame 3 is 1. If the network device 1 determines that the FlexE overhead frame 2 is not the response to the request information 1, the network device 1 sends a slot negotiation request to the network device 2 again. The FlexE overhead frame 3 is used to send a slot negotiation request 2, that is, a calendar switch request 2. In other words, the network device 1 requests to perform slot negotiation with the network device 2 again, and requests to switch the standby calendar to the active calendar.

S307: The network device 2 receives the FlexE overhead frame 3.

S308: The network device 2 sends a FlexE overhead frame 4 to the network device 1 in response to the received request information 2.

Specifically, if the network device 2 has completed device restart and made related preparations, the network device 2 enables CR interruption, and responds to the slot negotiation request 2 sent by the network device 1. The network device 1 and the network device 2 continue to perform an operation of calendar switch based on a negotiation result. A person skilled in the art may understand that, if at this time, the network device 2 is still in the restart state, or has not made related preparations, a slot negotiation request is repeatedly triggered until the network device 1 determines that the network device 2 makes a valid response to the slot negotiation request sent by the network device 1. The FlexE overhead frame 4 includes indication information 2, and the indication information 2 is used to indicate that the FlexE overhead frame 4 is a response to the request information 2.

S309: The network device 1 receives the FlexE overhead frame 4.

S310: The network device 1 determines, based on the indication information 2, that the FlexE overhead frame 4 is the response to the request information 2, and switches the standby calendar to the active calendar.

A specific description of S310 is described below with reference to S305.

S311: The network device 1 sends a FlexE overhead frame 5 to the network device 2, to indicate the network device 2 to switch the standby calendar to the active calendar.

A value of a CCC field in the FlexE overhead frame 5 is the same as a value of a CR field in the FlexE overhead frame 5, and the values are the same as the value of the CR field in the FlexE overhead frame 1.

S312: The network device 2 receives the FlexE overhead frame 5, and switches the standby calendar to the active calendar.

A person skilled in the art may understand that the FlexE overhead frame 3 is not necessarily an overhead frame adjacent to the FlexE overhead frame 2 in a time sequence, and may be an overhead frame sent after the network device 1 sends a plurality of slot negotiation requests to the network device 2. The operation "CR interruption" mentioned in this application means that after the network device receives a slot negotiation request overhead frame (if values of a CR and a CCC in a received FlexE overhead frame are different, the received FlexE overhead frame is considered to be a slot negotiation request), the network device reads calendar information carried in the overhead frame and updates a local slot table configuration. In a specific implementation, CR interruption may be implemented by software on a processor. The processor reads, through an interface connected to a network forwarding chip, overhead frame information stored in a register, and updates a local calendar configuration based on latest calendar configuration information carried in the overhead frame. In another specific implementation, CR interruption may be implemented by using a forwarding chip. For example, processing logic may be set in the chip to read information in the slot negotiation overhead frame, and update a local calendar configuration based on latest calendar configuration information carried in the overhead frame.

In the slot negotiation method provided in this application, the indication information is carried in the FlexE overhead frame sent by the RX back to the TX, so that the indication information can indicate whether the FlexE overhead frame is a response to the slot negotiation request sent by the TX. When the TX determines, based on the indication information, that the received FlexE overhead frame is not a response to the slot negotiation request sent by the TX, the TX sends a slot negotiation request again until the TX confirms that the RX responds to the slot negotiation request sent by the TX. In this way, a problem that traffic is interrupted because the RX mistakenly responds to the slot negotiation request sent by the TX can be avoided.

The following describes the indication information 1 and the indication information 2 mentioned in S305 and S310 in the foregoing method 300. In this application, the network device 1 may determine, in the following manner 1 to manner 3 (a determining manner is not limited herein), whether a received FlexE overhead frame is a response to request information (or a slot negotiation request) sent by the network device 1.

Manner 1: The indication information 1 and the indication information 2 are information indicated by newly extended fields in the FlexE overhead frames, and the newly extended field is not a CA field. For example, one or more bits are added to a reserved (Reserved) field in the FlexE overhead frame shown in FIG. 5, to identify the indication information 1 and the indication information 2. Alternatively, one field may be added to a management channel of the FlexE overhead frame, to identify the indication information 1 and the indication information 2. Specifically, the at least one newly added bit in the FlexE overhead frame 2 is the indication information 1, and the at least one newly added bit in the FlexE overhead frame 4 is indication information 2. In a specific implementation, one bit is added to each FlexE overhead frame, and different values of the newly added bit are used to separately identify the indication information 1 and the indication information 2. When a value of the newly added bit in a FlexE overhead frame is 1, the bit is used to indicate that the FlexE overhead frame is a response to a received slot negotiation request. When a value of the newly added bit in a FlexE overhead frame is 0, the bit is used to indicate that the FlexE overhead frame is not a response to a slot negotiation request. Specifically, when the value of the newly added bit in the FlexE overhead frame 2 is 1, the bit is used to indicate that the FlexE overhead frame 2 is a response to the request information 1. When the value of the newly added bit in the FlexE overhead frame 2 is 0, the bit is used to indicate that the FlexE overhead frame 2 is not a response to the request information 1. Similarly, when the value of the newly added bit in the FlexE overhead frame 4 is 1, the bit is used to indicate that the FlexE overhead frame 4 is a response to the request information 2. When the value of the newly added bit in the FlexE overhead frame 4 is 0, the bit is used to indicate that the FlexE overhead frame 4 is not a response to the request information 2. In another specific implementation, the indication information 1 and the indication information 2 may alternatively be identified in a bit map (bit map) manner. For example, two bits are added to each FlexE overhead frame, and each bit is separately mapped to the indication information 1 and the indication information 2. A specific indication manner is not described again. It should be understood that this application is not limited to the foregoing implementations. In the solution of the manner 1, a newly extended field in a FlexE overhead frame is used to indicate whether the FlexE overhead frame sent by the RX is a response to request information carried in a FlexE overhead frame sent by the TX. A CA field in a FlexE overhead frame is used to indicate a calendar, but is not used to indicate whether the FlexE overhead frame is a response to request information. In the foregoing implementation, ambiguity of a CA field in the conventional technology can be resolved without a change of an existing overhead frame format, a traffic interruption caused by the foregoing problem is avoided, and service continuity and stability are ensured.

Figure 9:
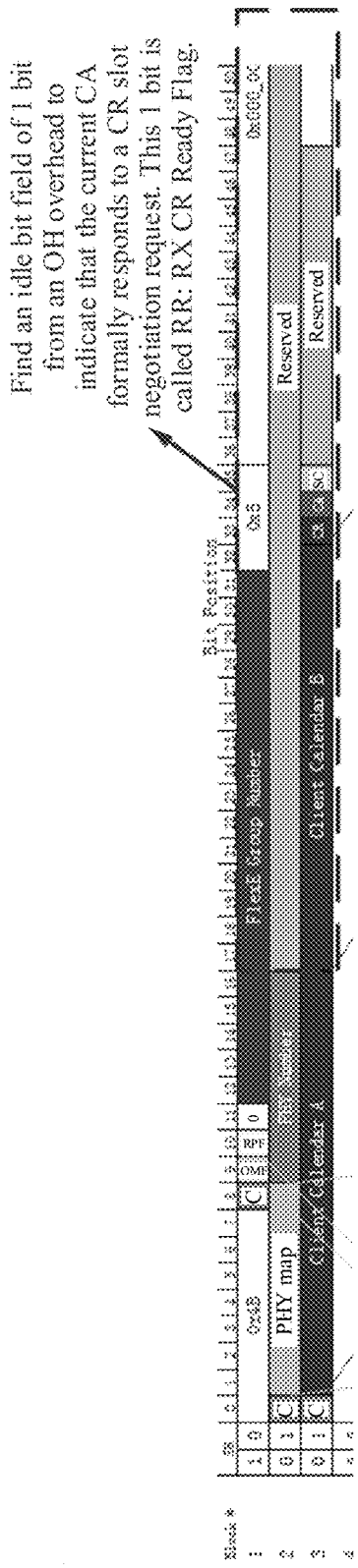
FIG. 9 is a schematic diagram of a packet format of extending an overhead frame according to this application.
Figure 10:
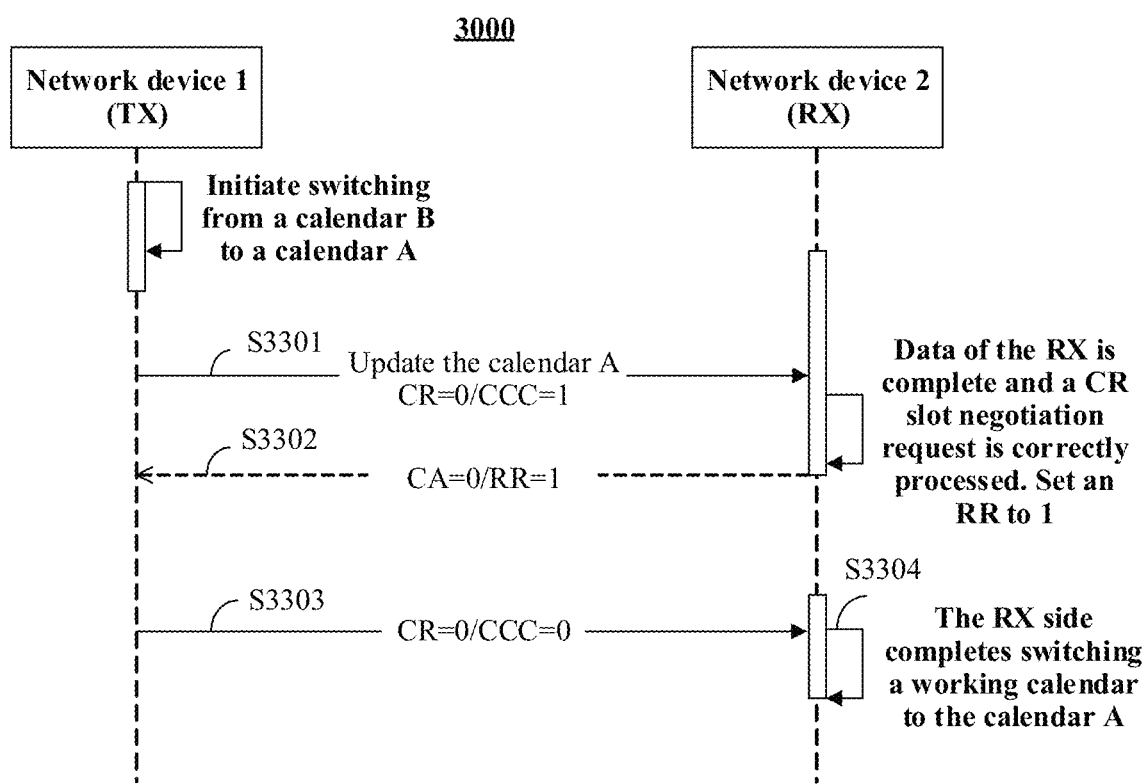
FIG. 10 is a schematic flowchart of a slot negotiation processing method according to this application.

With reference to FIG. 9 and FIG. 10, an example in which one bit is extended is used below to describe the manner 1.

As shown in FIG. 9, a 1-bit bit field is found idle in the FlexE overhead frame. For ease of description, in this application, the bit field is temporarily referred to as an RR flag (RX CR Ready Flag) bit. It may be understood that naming of the flag is not limited in this application.

(1) When the FlexE group in the RX direction is activated, the PHY is added, and CR interruption in the TX is processed, the RR flag is set to 1. If RR=1, a CA in a FlexE overhead frame sent back by the RX to the TX is used to indicate a trustworthy calendar in response to the slot negotiation request.

(2) If RR=0 in the FlexE overhead, the TX considers that the RX direction does not respond to the slot negotiation request. The TX continuously initiates a slot negotiation request. Negotiation is considered successful only when the RX direction responds with a FlexE overhead frame in which a value of an RR is 1 and a value of a CA is an expected value. Otherwise, a slot negotiation status is maintained.

With reference to FIG. 10, the following describes a specific slot negotiation method 3000 in the manner 1.

The TX initiates switching from the calendar B to the calendar A for the foregoing reasons.

S3301: The TX initiates a slot negotiation request.

The TX sends a FlexE overhead frame (CR=0/CCC=1) to the RX direction, to send the slot negotiation request. The TX sends latest configuration information of the calendar A to the RX by using the FlexE overhead frame.

S3302: The RX sends a slot negotiation response to the TX.

After the RX direction has made the preparations (for example, activating the FlexE group, adding the PHY to the group, enabling CR interruption of slot negotiation, and successfully receiving and processing the slot negotiation request (CR=0/CCC=1) from the TX), the RX sends the slot negotiation response to the TX. Specifically, the RX sends a FlexE overhead frame to the TX in response to the slot negotiation request. In the FlexE overhead frame, an RR flag is set to 1, and a CA flag is set to 0.

S3303: The TX switches from the calendar B to the calendar A, and sends a FlexE overhead frame (CR=0, CCC=0) to the RX to trigger the RX to complete switching from the calendar B to the calendar A.

The TX receives the FlexE overhead frame (CA=0, RR=1), and considers the FlexE overhead frame to be a valid response. The TX then completes slot negotiation, switches from the calendar B to the calendar A, and sends a FlexE OH overhead frame (CR=0, CCC=0) to the RX.

If the TX does not receive a valid slot negotiation response from the RX for a long time period, the TX periodically sends a slot negotiation request again.

S3304: After receiving the FlexE overhead frame (CR=0, CCC=0) from the TX, the RX switches from the calendar B to the calendar A.

After S3304, in a routine update FlexE overhead frame sent by the RX to the TX, an RR is set to 0 again, to be used for a slot negotiation request procedure initiated by the TX next time.

It should be noted that, in this implementation, after S3301 and before S3302, the following operations may be further included:

If the RX has not made the preparations, the RX periodically sends a FlexE overhead frame in which an RR is set to 0 to the TX.

The TX receives the FlexE overhead frame in which the RR is set to 0, and determines that the FlexE overhead is not a response to the slot negotiation request sent by the TX.

The TX sends a slot negotiation request to the RX again. In a FlexE overhead frame, a CR is set to 0 and a CCC is set to 1.

Manner 2: The indication information 1 and the indication information 2 may be information indicated by the CA fields in the FlexE overhead frames. In this manner, semantics of a CA field defined in the existing standard is changed. Specifically, in the current OIF standard, the semantics of the CA field has ambiguity, where the CA field is used to express a negotiation response, and to indicate a calendar. Ambiguity in a definition of a CA segment in the existing standard causes the technical problem described above in this application. In this implementation, the semantics of the CA is changed, where the CA is used to indicate validity of a negotiation response, but is not used to indicate a calendar, in other words, is not used to indicate a negotiation output. For example, when a CA in an overhead frame is 0, it indicates that the overhead frame is not a response to a slot negotiation request. When a CA in an overhead frame is 1, it indicates that the overhead frame is a response to a slot negotiation request. In this case, a value of the CA is not related to a calendar configuration, that is, the negotiation output. The CA field is used to indicate whether the FlexE overhead frame sent by the RX is a response to a calendar negotiation request sent by the TX. Specifically, in S305, the indication information 1 is information indicated when the CA field in the FlexE overhead frame 2 is set to a first value. In S310, the indication information 2 is information indicated when the CA field in the FlexE overhead frame 4 is set to a second value. For example, when the CA field in the FlexE overhead frame 2 is set to 0, the CA field is used to indicate that the FlexE overhead frame 2 is a response to the slot negotiation request 1, and is not used to indicate a calendar. When the CA field in the FlexE overhead frame 4 is set to 1, the CA field is used to indicate that the FlexE overhead frame 4 is a response to the slot negotiation request 2, and is not used to indicate a calendar. In the manner 2, the RX completes local preparations for calendar switching. In a FlexE overhead frame sent in response to the TX, a CA field is no longer used to indicate a calendar. As long as the TX receives the FlexE overhead frame in which the CA is set to the second value, the TX considers that negotiation is complete, and continues a calendar switch procedure.

The solution provided in the manner 2 changes the semantics of the CA field in the conventional technology, and abandons a semantic feature of the CA for indicating a calendar, in other words, abandons a semantic feature of the CA field for indicating a negotiation output. The CA field is used to indicate validity of a negotiation response, rather than a negotiation output. This resolves ambiguity of the CA field in the conventional technology, and effectively avoids impact on a service caused by an error in a slot negotiation procedure.

Figure 11:
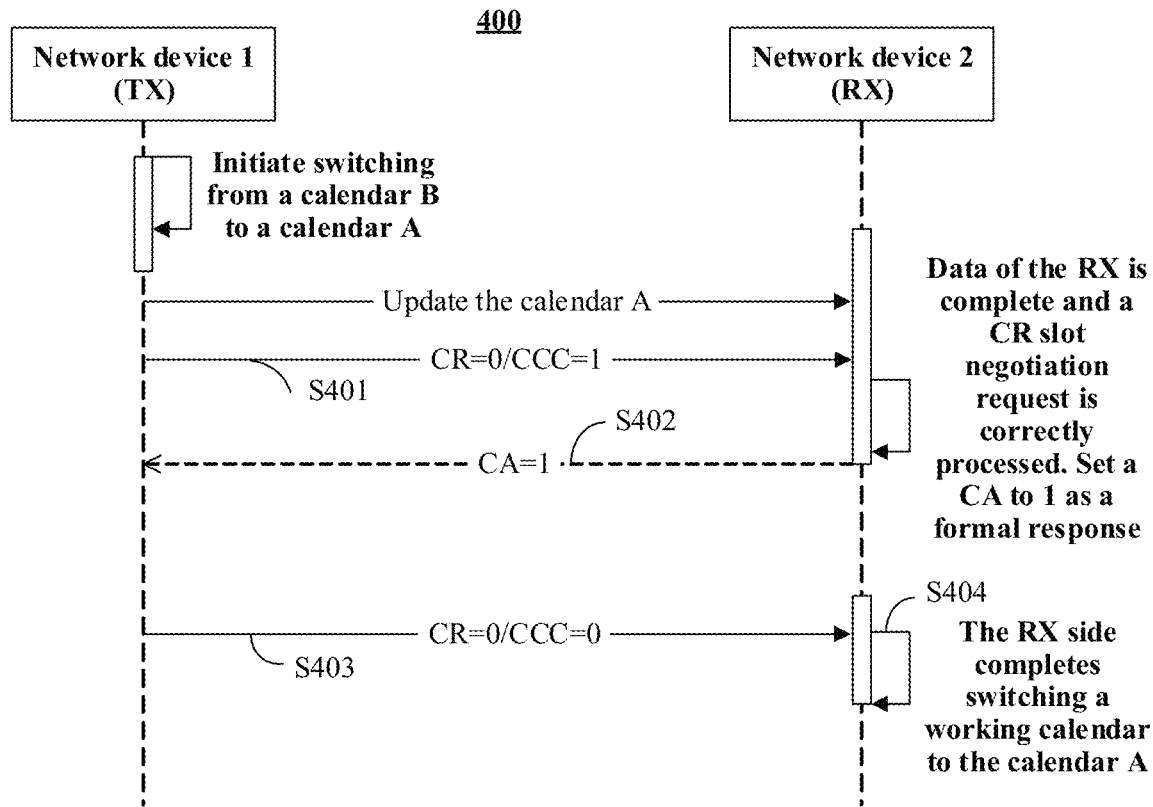
FIG. 11 is a schematic flowchart of a slot negotiation processing method according to this application.

A negotiation procedure 400 provided in the manner 2 is described below with reference to FIG. 11.

The TX initiates switching from the calendar B to the calendar A for the foregoing reasons.

S401: The TX initiates a slot negotiation request.

The TX sends a FlexE overhead frame (CR=0/CCC=1) to the RX direction, to send the slot negotiation request. The TX sends latest configuration information of the calendar A to the RX by using the FlexE overhead frame.

S402: The RX sends a slot negotiation response to the TX.

After the RX direction has made the preparations (for example, activating the FlexE group, adding the PHY to the group, enabling CR interruption of slot negotiation, and successfully receiving and processing the slot negotiation request (CR=0/CCC=1) from the TX), the RX sends the slot negotiation response to the TX. Specifically, the RX sends a FlexE overhead frame to the TX in response to the slot negotiation request. In the FlexE overhead frame, a CA flag is set to 1, used to indicate that the FlexE overhead frame is a response to the received slot negotiation request.

S403: The TX switches from the calendar B to the calendar A, and sends a FlexE overhead frame (CR=0, CCC=0) to the RX to trigger the RX to complete switching from the calendar B to the calendar A.

The TX receives the FlexE overhead frame (CA=1), and considers the FlexE overhead frame to be a valid response. The TX then completes slot negotiation, switches from the calendar B to the calendar A, and sends the FlexE overhead frame (CR=0, CCC=0) to the RX.

If the TX does not receive a valid slot negotiation response from the RX for a long time period, the TX periodically sends a slot negotiation request again.

S404: After receiving the FlexE overhead frame (CR=0, CCC=0) from the TX, the RX switches from the calendar B to the calendar A.

After S404, in a routine update FlexE overhead frame sent by the RX to the TX, a CA is set to 0 again, to be used for a slot negotiation request procedure initiated by the TX next time.

It should be noted that, in this implementation, after S401 and before S402, the following operations may be further included:

(a) If the RX has not made the preparations, the RX periodically sends a FlexE overhead frame in which a CA is set to 0 to the TX.

(b) After sending the slot negotiation request, the TX receives the FlexE overhead frame in which the CA is set to 0, and determines that the FlexE overhead is not a response to the slot negotiation request sent by the TX.

(c) The TX sends a slot negotiation request to the RX again. In a FlexE overhead frame, a CR is set to 0 and a CCC is set to 1.

Manner 3: A request packet and a response packet are added to a management channel of a FlexE overhead frame, to complete slot negotiation between the network device 1 and the network device 2. In this manner, a group of packets is added to the management channel to indicate validity of a negotiation response. A value of a CA field in the overhead frame may be used to indicate a calendar, that is, used to express a negotiation output, but not used to indicate the validity of the negotiation response. In this manner, the request packet (which is also referred to as a slot negotiation request packet in this application) and a response packet (which is also referred to as a slot negotiation response packet in this application) are added to the management channel, to express a slot negotiation request and a slot negotiation response. Based on whether a management channel of a received overhead frame carries a slot negotiation response packet, the TX determines whether the overhead frame is a response to a slot negotiation request packet sent by the TX. This resolves ambiguity of the CA field in the conventional technology, effectively avoids impact on a service caused by an error in a slot negotiation procedure. Specifically, in the manner 3, the indication information 1 in S305 is information indicated by a management channel of the FlexE overhead frame 2, and the indication information 2 in S310 is information indicated by a management channel of the FlexE overhead frame 4. There is no restriction on a type of a packet that can be carried over the management channel provided in the FlexE overhead frame, provided that the packet is transmitted in a specified encoding format. The specified encoding format indicates that a peer device can correctly decode the packet. A packet format added in the implementations of this application is not specifically limited in this application. The following describes the packet by using an example of an Ethernet packet format. A packet format used to indicate validity of slot negotiation is not limited to the packet format illustrated in this application.

It should be noted that the management channel described in this application complies with a management channel of an overhead frame defined in the existing standard. For example, the management channel is defined as the fourth to the eighth blocks in the overhead frame in the existing standard. In a future industry standard or an enterprise standard, if a definition of a management channel changes, the management channel described in this application is compatible with definitions of a management channel in various standards.

With reference to FIG. 12a to FIG. 12e and FIG. 13, the following describes a negotiation procedure in the manner 3.

Figure 12A:
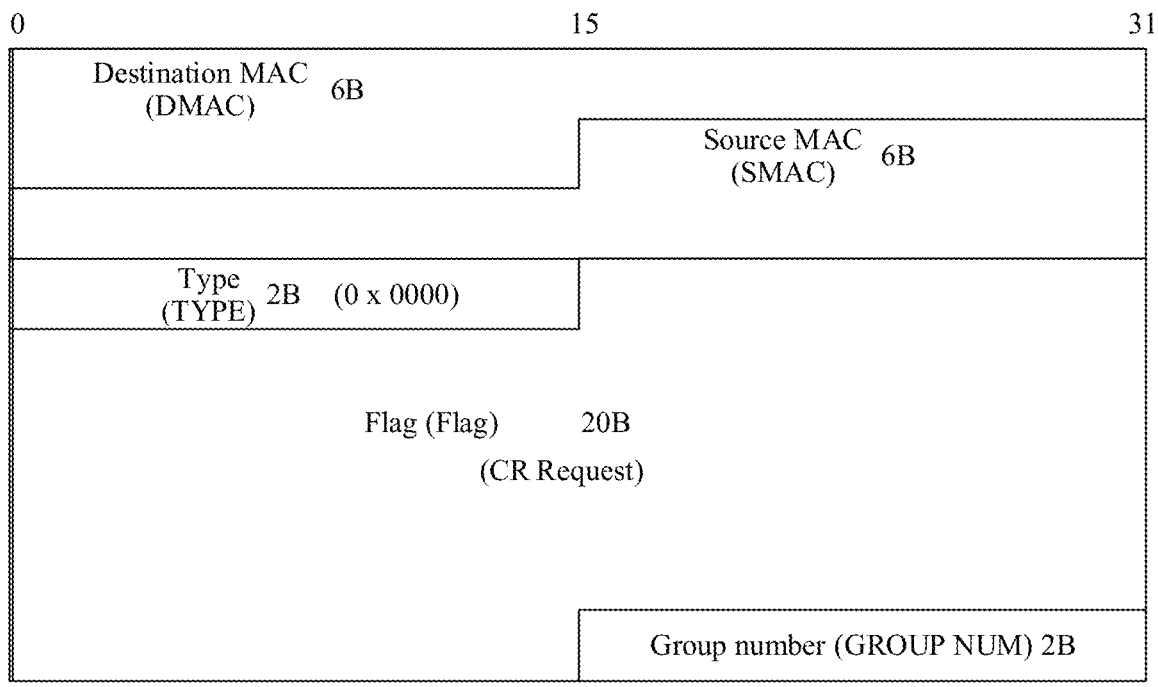
FIG. 12a is a schematic diagram of a format of a CR Request packet according to this application.
Figure 12B:
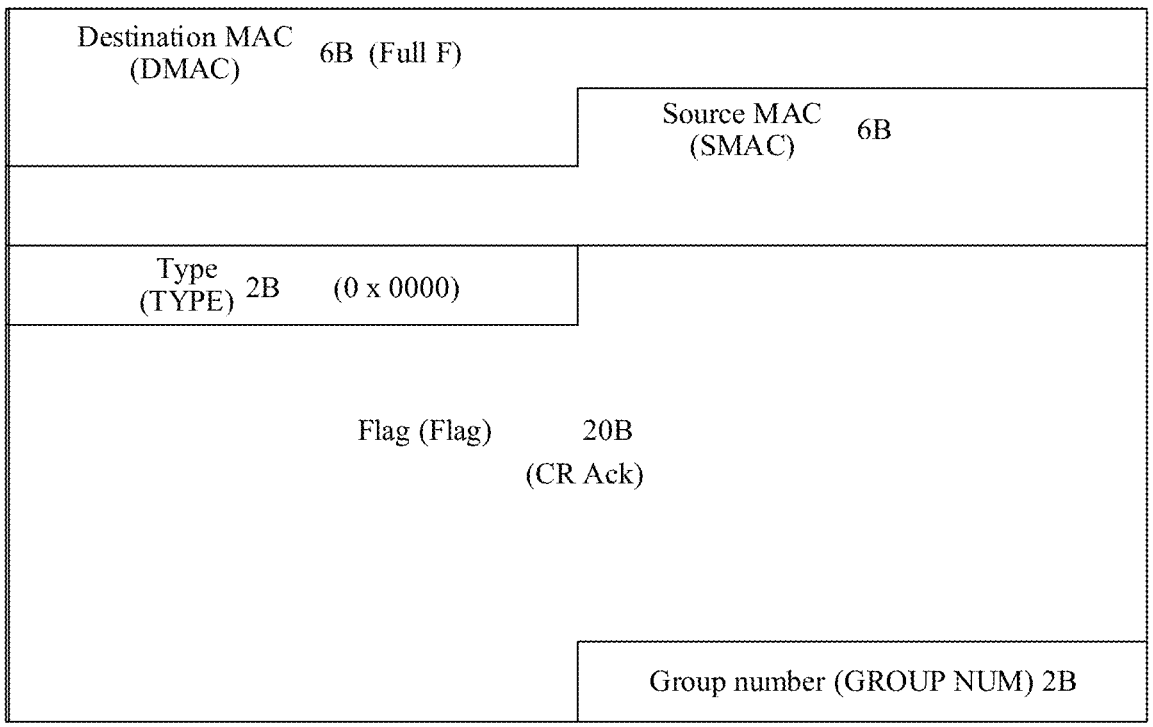
FIG. 12b is a schematic diagram of a format of a CR Ack packet according to this application.

In a specific implementation, FIG. 12a provides an example of a packet format of a slot negotiation request packet (CR Request) added to a management channel. FIG. 12b provides an example of a packet format of a slot negotiation response packet (CR Ack) added to a management channel.

Formats of the CR Request packet and the CR Ack packet are described below with reference to FIG. 12a and FIG. 12b.

SMAC indicates a source MAC address. For example, a length may be 6 bits, and a value may be a MAC address of a source port.

DMAC indicates a destination MAC. For example, a length may be 6 bits, and values of the 6 bits may all be 1.

TYPE indicates a packet type. For example, a length may be 2 bits, and values of the 2 bits may both be 0.

GROUP NUM indicates a FlexE group number. For example, a length may be 2 bits. GROUP NUM indicates a FlexE group to which the packet belongs.

Flag indicates a packet subtype. For example, a length may be 20 bits. In a specific implementation, a value of a Flag field in the CR Request packet may be a character string "CR Request". A value of a Flag field in the CR Ack packet may be a character string "CR Ack".

Figure 12C:
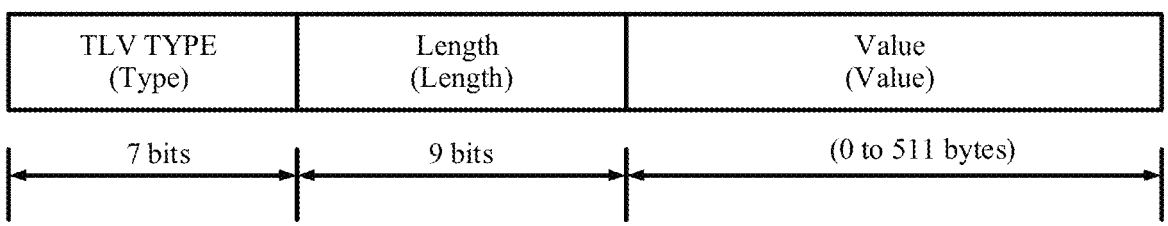
FIG. 12c is a schematic diagram of a format of an LLDP packet according to this application.
Figure 12D:
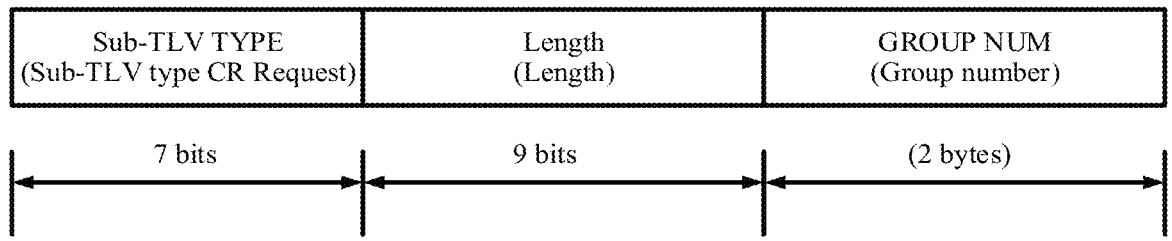
FIG. 12d is a schematic diagram of a format of a CR Request packet according to this application.
Figure 12E:
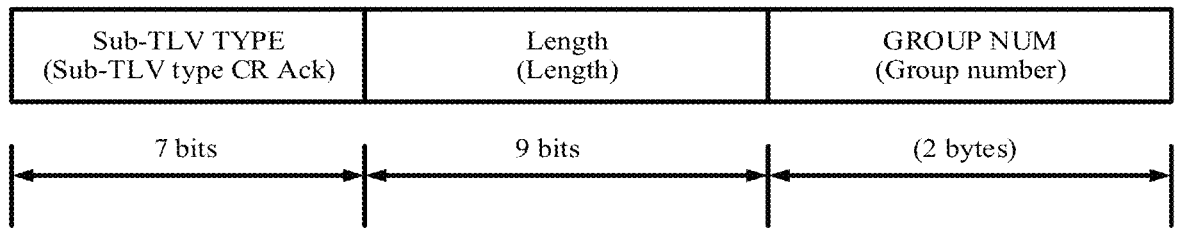
FIG. 12e is a schematic diagram of a format of a CR Request packet according to this application.

In another specific implementation, FIG. 12c and FIG. 12e provide another specific example of a CR Request packet and a CR Ack. In this example, a parent TLV field carried in a payload of a link layer discovery protocol LLDP) packet is extended and a sub-TLV type is added, to carry a CR Request and a CR Ack packet.

The payload of the LLDP packet includes a plurality of concatenated TLVs. FIG. 12c shows a parent TLV that includes a type field, a length field, and a value field. The value field may be concatenated by a plurality of sub-TLVs. For example, a TLV type (TYPE=127) reserved by a vendor is a parent TLV type. The following uses a parent TLV type 127 (where a value of a T field is 127) as an example to describe how to add a CR Request packet and a CR Ack packet to a parent TLV field of an LLDP packet.

FIG. 12d is a schematic diagram of a specific format of a sub-TLV that is extended in the value field shown in FIG. 12c and that is used to indicate the CR Request packet. FIG. 12e is a schematic diagram of a specific format of a sub-TLV that is extended in the value field shown in FIG. 12c and that is used to indicate the CR Ack packet.

In FIG. 12d, the sub-TLV field includes a type field, a length field, and a value field. The type field is used to indicate that a type of the sub-TLV is a CR Request packet, and a length may be, for example, 7 bits. The length field indicates a length of the V field, and a length of the length field may be, for example, 9 bits. The value field is used to carry a FlexE group number, and a length may be, for example, 2 bytes.

In FIG. 12e, the sub-TLV field includes a type field, a length field, and a value field. The type field is used to indicate that a type of the sub-TLV is a CR Ack packet, and a length may be, for example, 7 bits. The length field indicates a length of the V field, and a length of the length field may be, for example, 9 bits. The value field is used to carry a FlexE group number, and a length may be, for example, 2 bytes.

A person skilled in the art may understand that the packet formats for the CR Request packet and the CR Ack packet provided in the embodiments of this application are merely examples for description, and should not be construed as a limitation on the packet format.

Figure 13:
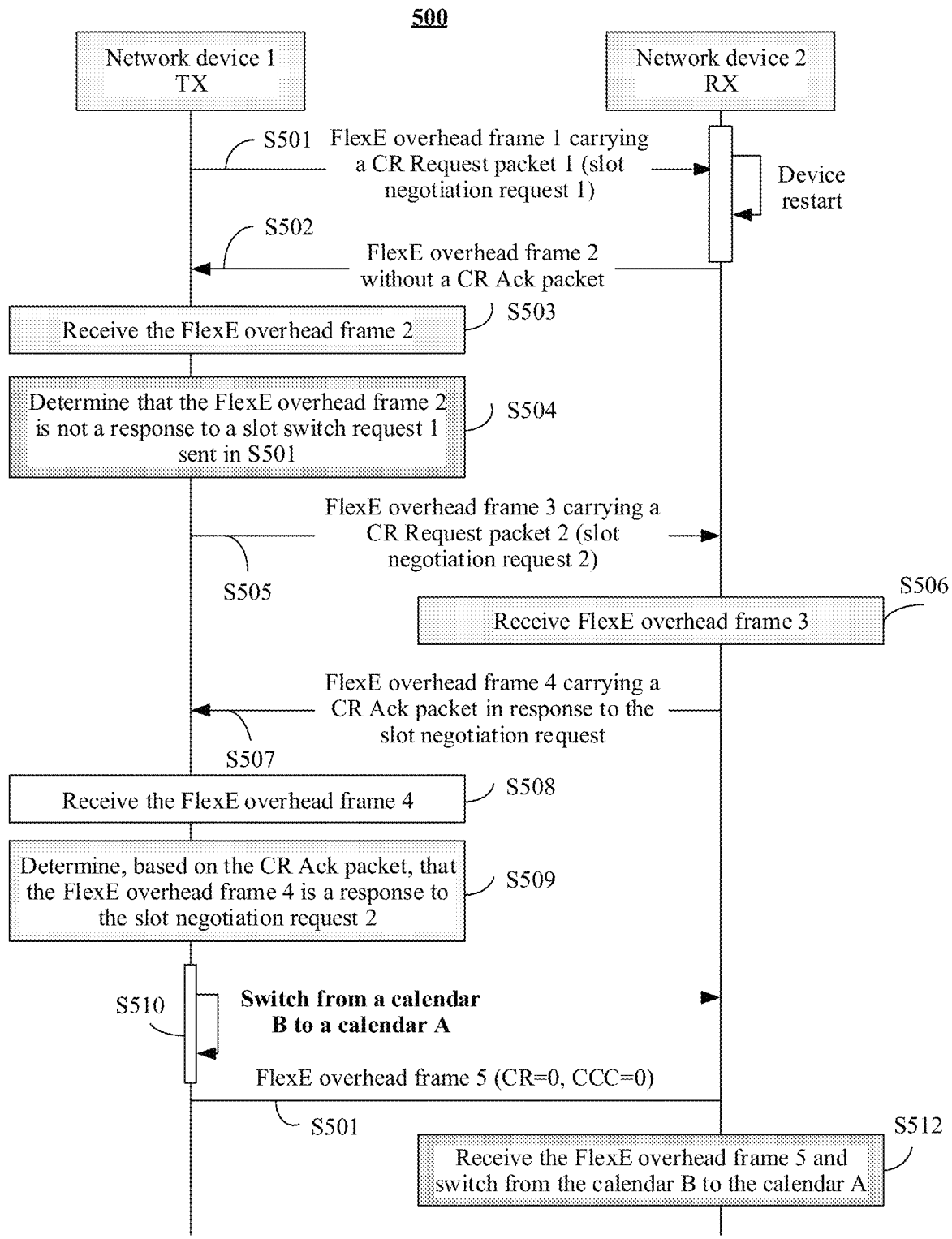
FIG. 13 is a schematic flowchart of a slot negotiation processing method according to this application.

With reference to FIG. 13, the following describes an example of a slot negotiation method 500 performed using the manner 3.

S501: The TX sends a CR Request packet to the RX to send a slot negotiation request to the RX.

Specifically, the TX sends a FlexE overhead frame 1 to the RX to send a slot negotiation request 1. A management channel of the FlexE overhead frame 1 carries request information 1. Specifically, the request information 1 is a CR Request packet 1 for requesting the network device 2 to switch from the current calendar B to the calendar A. In this case, an active calendar is the calendar B, and a standby calendar is the calendar A. The TX sends the CR Request packet 1 to the RX and waits for a response from the RX.

After S501, there may be two cases.

(a) If the RX responds with a CR Ack packet, the RX is considered ready and a calendar switch can be performed. Therefore, S510 to S512 are performed after S501.

(b) If the RX direction does not respond with a CR Ack packet, S502 to S512 are performed after S501. The TX sends a CR Request packet again to request slot negotiation again and waits for a response from the RX direction.

After the RX direction receives the CR Request packet, the RX direction determines that preparations are made, for example, a FlexE group of the RX is activated, a PHY is added to the group, and CR slot negotiation interruption is enabled, and then responds with a CR Ack packet by using a management channel of a FlexE overhead frame.

If the RX direction is not ready for slot negotiation, the RX direction does not respond to the CR Request packet, in other words, does not send a CR Ack packet.

S502: The RX sends a routine update FlexE overhead frame 2 to the TX.

A management channel of the FlexE overhead frame 2 does not carry a response packet 1. In this implementation, the response packet 1 is a CR Ack packet 1. In this case, the management channel of the FlexE overhead frame 2 is the indication information 1 carried in the FlexE overhead frame 2 in this application.

S503: The TX receives the FlexE overhead frame 2.

S504: The TX determines, based on the management channel of the FlexE overhead frame 2, that the FlexE overhead frame 2 is not a response to the slot negotiation request 1.

S505: The TX sends a FlexE overhead frame 3 to the RX to send a slot negotiation request 2.

A management channel of the FlexE overhead frame 3 carries request information 2, namely, a negotiation request packet 2 (CR Request packet 2), to send the slot negotiation request 2.

S506: The RX receives the FlexE overhead frame 3.

S507: The RX sends a FlexE overhead frame 4 to the TX to respond to the received slot negotiation request 2.

Specifically, a management channel of the FlexE overhead frame 4 carries a response packet 2, namely, a negotiation response packet 2 (CR Ack packet 2). In this case, the management channel of the FlexE overhead frame 4 is the indication information 2 carried in the FlexE overhead frame 4 in this application.

S508: The TX receives the FlexE overhead frame 4.

S509: The TX determines, based on the indication information 2, that the FlexE overhead frame 4 is a response to the slot negotiation request 2.

S510: The TX switches from the calendar B to the calendar A.

S511: The TX sends a FlexE overhead frame 5 (CR=0, CCC=0) to the RX, to trigger the RX to complete switching from the calendar B to the calendar A.

S512: The RX receives the FlexE overhead frame 5, and completes switching from the calendar B to the calendar A.

In another specific implementation, in a slot negotiation procedure between the TX and the RX, S501 to S509 are used as a pre-negotiation procedure. After S509 and before S510, the TX determines that the pre-negotiation procedure succeeds, and starts to execute an actual negotiation procedure. In this manner, it can be ensured that the existing slot negotiation procedure remains unchanged. In the actual negotiation procedure, a definition of a CA field complies with a definition of the CA field in the existing standard. In the actual negotiation procedure, the pre-negotiation procedure is complete, in other words, actual negotiation starts only after the pre-negotiation succeeds. Therefore, a problem that the RX mistakenly responds to a slot negotiation request sent by the TX can be avoided, and normal service forwarding can be effectively ensured.

The actual negotiation procedure mentioned in this implementation is briefly described below. For descriptions of the actual negotiation procedure, refer to specific descriptions in the method 100 described above.

Step A: The TX initiates a slot negotiation request 3 to the RX.

Specifically, that the TX receives the CR Ack packet from the direction indicates that the RX is ready to perform slot negotiation with the TX. Again, the TX sends a FlexE overhead frame 6 to the RX, to initiate the slot negotiation request 3. The TX and the RX start slot negotiation based on the existing procedure, and initiate negotiation of switching from the slot table calendar B to the calendar A. The TX sends content of a latest calendar A to the RX by using the FlexE overhead frame 6 in which CR=0 and CCC=1, to negotiate with the RX to switch the current working calendar from the calendar B to the calendar A.

Step B: The RX sends a response to the slot negotiation request 3 to the TX.

The RX has responded with the CR Ack request to the TX before, so that after receiving the slot negotiation request 3 (CR=0/CCC=1) from the TX, the RX is ready to process the slot negotiation request 2 from the TX. The RX enables CR interruption, updates configuration of the calendar A, and sends a FlexE overhead frame 7 to the TX in response to the received slot negotiation request 3. The RX sends the FlexE overhead frame 7 to the TX to send a response, and in the FlexE overhead frame 7, a CA field is set to 0.

Step C: The TX switches the local active calendar from the calendar B to the calendar A, sends a FlexE overhead frame (CR=0, CCC=0) to the RX, and triggers the RX to complete switching from the calendar B to the calendar A.

After step C, the foregoing steps S510 to S512 are continued, and details are not described herein again.

In conclusion, the slot negotiation method provided in this application can resolve a mistaken response in the FlexE overhead slot negotiation mechanism defined in the current OIF standard. An essence of the mistaken response is that identifying a response message of FlexE overhead slot negotiation only depends on expression of a CA bit field. However, because the CA bit field is only 1 bit, and needs to express both a negotiation output and a negotiation response, there is ambiguity in semantic expression. According to the foregoing solution of this application, ambiguity in the CA bit field is effectively eliminated. Therefore, the TX can accurately determine whether a received FlexE overhead is a response to a slot negotiation request sent by the TX, and determine, based on a determining result, whether to trigger a slot negotiation request or calendar switching again. This ensures that the TX and the RX can perform correct slot negotiation, so that accuracy of a slot negotiation result is ensured, a success rate of slot negotiation is effectively improved, and impact of a slot negotiation error on a normal flexible Ethernet service caused by a mistaken RX response in the conventional technology is reduced.

Figure 14:
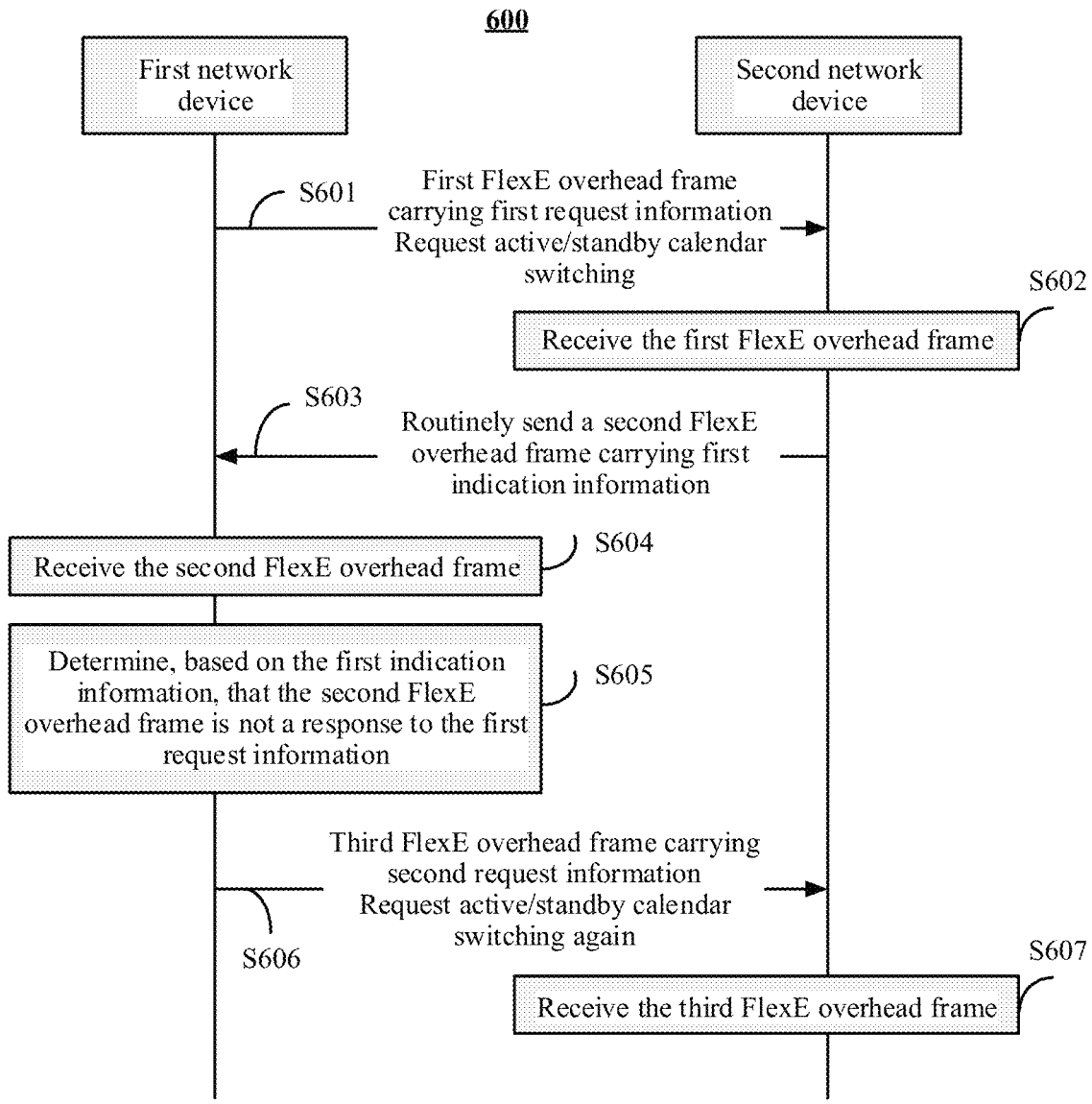
FIG. 14 is a schematic flowchart of a slot negotiation method according to this application.

FIG. 14 is a schematic flowchart of a slot negotiation method 600 according to an embodiment of this application. A network architecture to which the method 600 is applicable includes at least a first network device and a second network device. For example, the first network device may be the network device 1 (TX) shown in FIG. 3, and the second network device may be the network device 2 (RX) shown in FIG. 3. The method shown in FIG. 14 may implement the method shown in any embodiment described with reference to FIG. 6 to FIG. 13. For example, the first network device and the second network device in FIG. 14 may be the network device 1 and the network device 2 respectively in the method 300 shown in FIG. 8. The method 600 shown in FIG. 14 includes the following steps.

S601: The first network device sends a first flexible Ethernet FlexE overhead frame to the second network device.

The first FlexE overhead frame includes first request information, and the first request information is used to request the second network device to switch a standby calendar to an active calendar.

S602: The second network device receives the first FlexE overhead frame of the first network device.

S603: The second network device sends a second FlexE overhead frame to the first network device.

S604: The first network device receives the second FlexE overhead frame sent by the second network device.

S605: The first network device determines, based on first indication information in the second FlexE overhead frame, that the second FlexE overhead frame is not a response to the first request information.

S606: The first network device sends a third FlexE overhead frame to the second network device.

S607: The second network device receives the third FlexE overhead frame.

The third FlexE overhead frame includes second request information, and the second request information is used to request the second network device to switch the standby calendar to the active calendar.

In a specific implementation, the first request information is a first request packet carried over a management channel of the first FlexE overhead frame. The first request packet may be, for example, a slot negotiation request packet, and has a packet format described in the embodiments corresponding to FIG. 12*a* and FIG. 12*c*.

In a specific implementation, the first request information is information indicated by a CR and a CCC field carried in the first FlexE overhead frame. If values of the CR field and the CCC field are different, it indicates that the first FlexE overhead frame is used for a slot negotiation request.

In a specific implementation, the second request information is a second request packet carried over a management channel of the third FlexE overhead frame. The second request packet may be, for example, a slot negotiation request packet, and has a packet format described in the embodiments corresponding to FIG. 12*a* and FIG. 12*c*.

In a specific implementation, the second request information is information indicated by a CR and a CCC field carried in the third FlexE overhead frame. If values of the CR field and the CCC field are different, it indicates that the third FlexE overhead frame is used for a slot negotiation request.

In a specific implementation, the first indication information is a management channel of the second FlexE overhead frame, the management channel of the second FlexE overhead frame does not carry a first response packet, where the first response packet is used to indicate that the second FlexE overhead frame is a response to the first request information.

In a specific implementation, the first indication information is information indicated by a first field in the second FlexE overhead frame, and the first field is different from a calendar switch acknowledgment (CA) field in the second FlexE overhead frame.

In a specific implementation, the first indication information is information indicated by a calendar switch acknowledgment (CA) field in the second FlexE overhead frame, the first indication information is used to indicate that the second FlexE overhead frame is not a response to the first request information, and the first indication information is not used to indicate a calendar.

According to the slot negotiation method 600, after sending a first slot negotiation request to the second network device, the first network device sends a new slot negotiation request again after determining that the FlexE overhead frame returned by the second network device is not a response to the slot negotiation request sent by the first network device. Therefore, a service interruption caused by determining a routine update FlexE overhead frame sent by the second network device as a response of the second network device to the slot negotiation request sent by the first device can be effectively avoided.

In the method 600, after S607, the method 600 may further include:

(a) The first network device receives a fourth FlexE overhead frame sent by the second network device; and the first network device determines, based on second indication information carried in the Fourth FlexE overhead frame, that the fourth FlexE overhead frame is a response to the second request information.

(b) In a specific implementation, when determining that the fourth FlexE overhead frame is a response to the second request information, the first network device performs active/standby calendar switching, that is, switches the standby calendar to the active calendar.

In another specific manner, when in the method 600, a request packet and a response packet are added to a management channel of a FlexE overhead frame to perform slot negotiation, after step (b), the method 600 may further include:

(c) The first network device sends a fifth FlexE overhead frame to the second network device, where a CR field and a CCC field in the fifth FlexE overhead frame are different, and the fifth FlexE overhead frame is used to send a third slot negotiation request, to request to switch the standby calendar to the active calendar.

(d) The second network device receives the fifth FlexE overhead frame, and sends a sixth FlexE overhead frame to the first network device.

The sixth FlexE overhead frame is a response to the third slot negotiation request.

(e) The first network device receives the sixth FlexE overhead frame, and determines, based on a CA field in the sixth FlexE overhead frame, that the sixth FlexE overhead frame is a response to the third slot negotiation request.

(f) The first network device performs active/standby calendar switching, that is, switches the standby calendar to the active calendar.

In a specific implementation, the second indication information is a management channel of the fourth FlexE overhead frame, the management channel of the fourth FlexE overhead frame carries a second response packet, and the second response packet is used to indicate that the fourth FlexE overhead frame is a response to the second request information.

In another specific implementation, the second indication information is information indicated by a calendar switch acknowledgment (CA) field in the fourth FlexE overhead frame, the second indication information is used to indicate that the fourth FlexE overhead frame is a response to the second request information, and the second indication information is not used to indicate a calendar.

In another specific implementation, the second indication information is information indicated by a second field in the fourth FlexE overhead frame, and the second field is different from a calendar switch acknowledgment (CA) field in the fourth FlexE overhead frame.

When the method 600 shown in FIG. 14 is used to implement the method corresponding to any one of FIG. 6 to FIG. 13, for example, the first request information and the second request information may correspond to the request information 1 and the request information 2 described in the foregoing method embodiments. The first indication information and the second indication information may, for example, correspond to the indication information 1 and the indication information 2 described in the foregoing method examples. For specific formats of the first request information, the second request information, the first indication information, and the second indication information, and specific implementations of the steps in the method 600, refer to the related descriptions of the corresponding steps in the foregoing method embodiments. Details are not described herein again.

Figure 15:
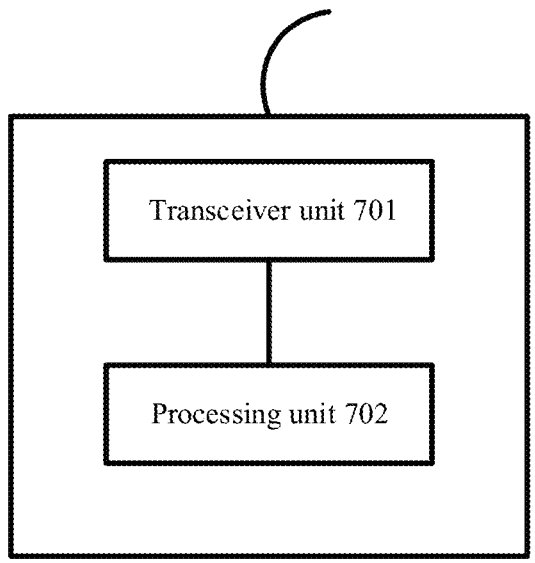
FIG. 15 is a schematic diagram of a structure of a network device according to an embodiment of this application.

The following describes a network device 700 provided in an embodiment of this application with reference to FIG. 15. The network device 700 may be applied to the network architecture shown in FIG. 3. For example, the network device 700 may be the network device 1 (TX) or the network device 2 (RX) in this application, and is configured to perform the method in the embodiment corresponding to any one of the foregoing FIG. 6 to FIG. 14. The network device 700 may alternatively be the first network device or the second network device described in this application, and is configured to perform the method corresponding to FIG. 14. The network device 700 includes a transceiver unit 701 and a processing unit 702. The transceiver unit 701 is configured to perform receiving and sending operations, and the processing unit is configured to perform an operation other than receiving and sending. For example, when the network device 700 serves as the first network device to perform the method 600 shown in FIG. 14, the transceiver unit 701 may be configured to: send the first flexible Ethernet FlexE overhead frame to the second network device, receive the second FlexE overhead frame sent by the second network device, and send the third FlexE overhead frame to the second network device. The processing unit 702 may be configured to determine, based on the first indication information in the second FlexE overhead frame, that the second FlexE overhead frame is not a response to the first request information.

Figure 16:
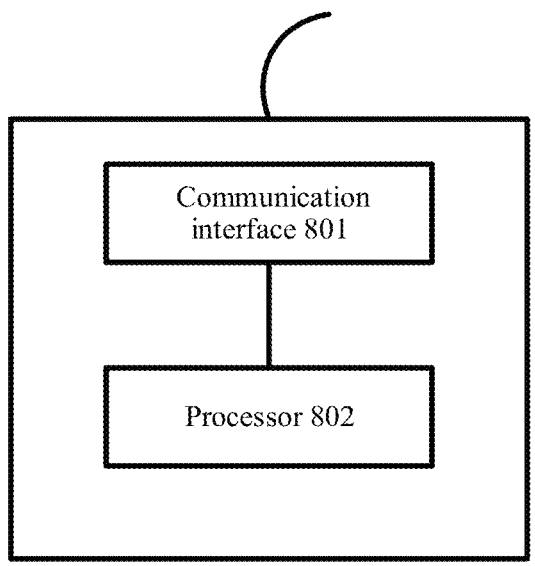
FIG. 16 is a schematic diagram of a structure of a network device according to an embodiment of this application.

The following describes another network device 800 provided in an embodiment of this application with reference to FIG. 16. The network device 800 may be applied to the network architecture shown in FIG. 3. For example, the network device 800 may be the network device 1 (TX) or the network device 2 (RX) described in this application, and is configured to perform operations performed by the network device 1 or the network device 2 in the method in the embodiment corresponding to any one of FIG. 6 to FIG. 13. The network device 800 may alternatively be the first network device or the second network device described in this application, and performs operations performed by the first network device or the second network device in the method corresponding to FIG. 14. The network device 800 includes a communication interface 801 and a processor 802 connected to the communication interface. The communication interface 801 is configured to perform receiving and sending operations, and the processor 802 is configured to perform operations other than receiving and sending. For example, when the network device 800 serves as the first network device to perform the method 600 shown in FIG. 14, the communication interface 801 may be configured to: send the first flexible Ethernet FlexE overhead frame to the second network device, receive the second FlexE overhead frame sent by the second network device, and send the third FlexE overhead frame to the second network device. The processor 802 may be configured to determine, based on the first indication information in the second FlexE overhead frame, that the second FlexE overhead frame is not a response to the first request information.

Figure 17:
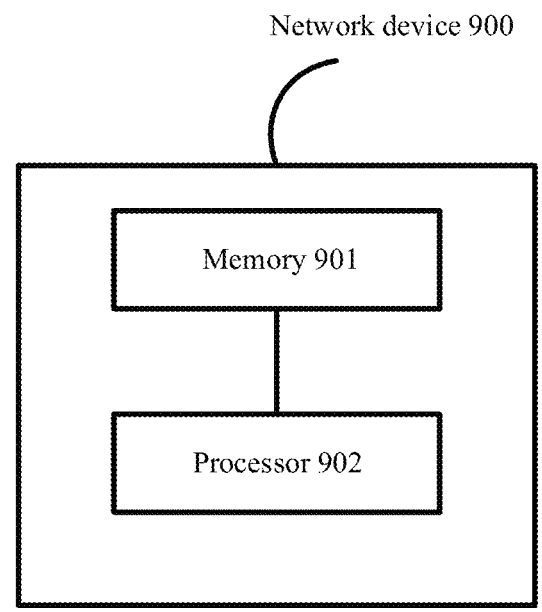
FIG. 17 is a schematic diagram of a structure of a network device according to an embodiment of this application.

The following describes another network device 900 provided in an embodiment of this application with reference to FIG. 17. The network device 900 may be applied to the network architecture shown in FIG. 3. For example, the network device 900 may be the network device 1 (TX) or the network device 2 (RX) described in this application, and is configured to perform operations performed by the network device 1 or the network device 2 in the method in the embodiment corresponding to any one of FIG. 6 to FIG. 13. The network device 900 may alternatively be the first network device or the second network device described in this application, and performs operations performed by the first network device or the second network device in the method corresponding to FIG. 14. The network device 900 includes a memory 901 and a processor 902 connected to the memory. The memory 901 stores instructions. The processor 902 reads the instructions, so that the network device 900 performs the method performed by the TX or the RX in the embodiment corresponding to any one of FIG. 6 to FIG. 13, or performs the method performed by the first network device or the second network device in the embodiment corresponding to FIG. 14.

Figure 18:
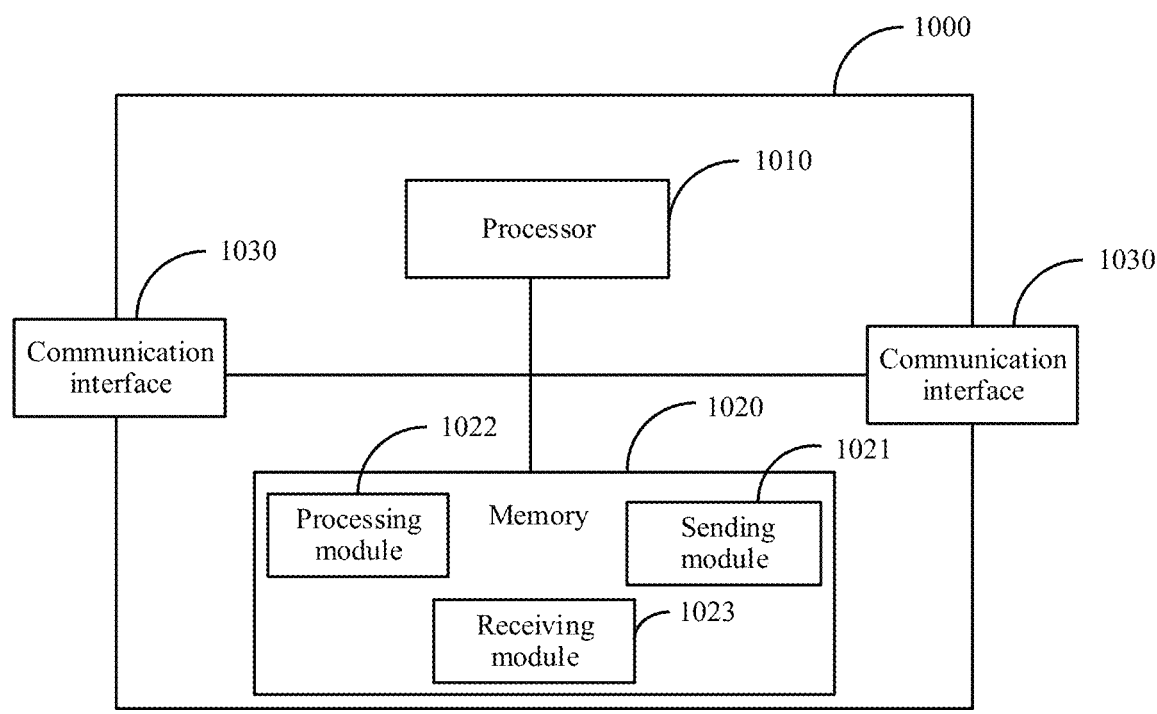
FIG. 18 is a schematic diagram of a structure of a network device according to an embodiment of this application.

The following describes another network device 1000 provided in an embodiment of this application with reference to FIG. 18. The network device 1000 may be applied to the network architecture shown in FIG. 3. For example, the network device 1000 may be the network device 1 (TX) or the network device 2 (RX) described in this application, and is configured to perform operations performed by the network device 1 or the network device 2 in the method in the embodiment corresponding to any one of FIG. 6 to FIG. 13. The network device 1000 may alternatively be the first network device or the second network device described in this application, and performs operations performed by the first network device or the second network device in the method corresponding to FIG. 14. As shown in FIG. 18, the network device 1000 includes a processor 1010, a memory 1020 coupled to the processor, and communication interfaces 1030. In a specific implementation, the memory 1020 stores computer-readable instructions. The computer-readable instructions include a plurality of software modules, for example, a sending module 1021, a processing module 1022, and a receiving module 1023. After executing the foregoing software modules, the processor 1010 may perform a corresponding operation based on an indication of each software module. In this embodiment, an operation performed by a software module actually refers to an operation performed by the processor 1010 based on an indication of the software module. For example, when the network device 1000 serves as the first network device to perform the method shown in FIG. 14, the sending module 1021 is configured to send the first FlexE overhead frame and the third FlexE overhead frame to the second network device. The receiving module 1023 is configured to receive the second FlexE overhead frame sent by the second network device. The processing module 1022 is configured to determine, based on the indication information in the second FlexE overhead frame, that the second FlexE overhead frame is not a response to the first request information carried in the first FlexE overhead frame. In addition, after executing the computer-readable instructions in the memory 1020, the processor 1010 may perform, based on the indication of the computer-readable instructions, all operations that can be performed by the network device 1, the network device 2, the first network device, or the second network device. For example, when the network device 1000 serves as the network device 1 or the network device 2, the network device 1000 may separately perform all the operations performed by the network device 1 or the network device 2 in the embodiments corresponding to FIG. 6 to FIG. 13. When the network device 1000 serves as the first network device or the second network device, the network device 1000 may separately perform all the operations performed by the first network device or the second network device in the embodiment corresponding to FIG. 14.

The processor mentioned in this application may be a central processing unit (CPU), a network processor (NP), or a combination of the CPU and the NP. Alternatively, the processor may be an application-specific integrated circuit (ASIC), a programmable logic device (PLD), or a combination thereof. The PLD may be a complex programmable logic device (CPLD), a field programmable gate array (FPGA), generic array logic (GAL), or any combination thereof. The processor 1010 may be one processor, or may include a plurality of processors. The memory mentioned in this application may be a volatile memory such as a random-access memory (RAM); a non-volatile memory such as a read-only memory (ROM), a flash memory, a hard disk drive (HDD), or a solid-state drive (SSD), or a combination of the foregoing types of memories. The memory may be one memory, or may include a plurality of memories.

An embodiment of this application further provides a communication system including a first network device and a second network device. The first network device and the second network device may be the network devices described in any one of FIG. 15 to FIG. 18, and are used to perform the method in any one of the embodiments corresponding to FIG. 6 to FIG. 14.

This application further provides a computer program product including a computer program. When the computer program runs on a computer, the computer can perform the method performed by the network device 1 and/or the network device 2 in any embodiment corresponding to FIG. 6 to FIG. 13.

This application further provides a computer program product including a computer program. When the computer program runs on a computer, the computer can perform the method performed by the first network device and/or the second network device in the embodiment corresponding to FIG. 14.

This application provides a computer-readable storage medium, including computer instructions. When the computer instructions are run on a computer, the computer can perform the method performed by the network device 1 and/or the network device 2 in any embodiment corresponding to FIG. 6 to FIG. 13.

This application provides a computer-readable storage medium, including computer instructions. When the computer instructions are run on a computer, the computer can perform the method performed by the first network device and/or the second network device in the embodiment corresponding to FIG. 14.

A person of ordinary skill in the art may be aware that, in combination with the examples described in the embodiments disclosed in this specification, modules and method operations may be implemented through electronic hardware or a combination of computer software and electronic hardware. Whether the functions are performed by hardware or software depends on particular applications and design constraints of the technical solutions. A person skilled in the art may use different methods to implement the described functions for each particular application.

It may be clearly understood by a person skilled in the art that, for the purpose of convenient and brief description, for a detailed working process of the foregoing system, apparatus, and module, refer to a corresponding process in the foregoing method embodiments, and details are not described herein again.

All or some of the foregoing embodiments may be implemented by using hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

All parts in this specification are described in a progressive manner. For same or similar parts in the implementations, mutual reference may be made. Each implementation focuses on a difference from other implementation. Especially, apparatus and system embodiments are basically similar to a method embodiment, and therefore are described briefly. For related parts, refer to descriptions of the method embodiment.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A slot negotiation method performed by a first network device, comprising:
    sending a first flexible Ethernet (FlexE) overhead frame to a second network device, wherein the first FlexE overhead frame comprises first request information, and the first request information is used to request the second network device to switch a standby calendar to an active calendar;
    receiving a second FlexE overhead frame sent by the second network device, wherein the second FlexE overhead frame comprises a first indication information that indicates that the second FlexE overhead frame is not a response to the first request information; and
    sending a third FlexE overhead frame to the second network device, wherein the third FlexE overhead frame comprises second request information, and the second request information is used to request the second network device to switch the standby calendar to the active calendar.

2. The method according to claim 1, wherein the first request information is a request packet carried over a management channel of the first FlexE overhead frame.

3. The method according to claim 1, wherein the first indication information is information indicated by a management channel of the second FlexE overhead frame, and the management channel of the second FlexE overhead frame does not carry a first response packet, wherein the first response packet indicates that the second FlexE overhead frame is a response to the first request information.

4. The method according to claim 1, wherein the first indication information is information indicated by a first field in the second FlexE overhead frame, and the first field is different from a calendar switch acknowledgment (CA) field in the second FlexE overhead frame.

5. The method according to claim 1, wherein the first indication information is information indicated by a calendar switch acknowledgment (CA) field in the second FlexE overhead frame, the first indication information indicates that the second FlexE overhead frame is not a response to the first request information, and the first indication information is not used to indicate a calendar.

6. The method according to claim 1, wherein the method further comprises:
    receiving a fourth FlexE overhead frame sent by the second network device, wherein the fourth FlexE overhead frame comprises a second indication information that indicates that the fourth FlexE overhead frame is a response to the second request information.

7. The method according to claim 6, wherein the second indication information is information indicated by a management channel of the fourth FlexE overhead frame, the management channel of the fourth FlexE overhead frame carries a second response packet, and the second response packet is used to indicate that the fourth FlexE overhead frame is the response to the second request information.

8. The method according to claim 6, wherein the second indication information is information indicated by a calendar switch acknowledgment (CA) field in the fourth FlexE overhead frame, the second indication information is used to indicate that the fourth FlexE overhead frame is the response to the second request information, and the second indication information is not used to indicate a calendar.

9. A slot negotiation method performed by a second network device, comprising
receiving a first flexible Ethernet (FlexE) overhead frame sent by a first network device, wherein the first FlexE overhead frame comprises first request information, and the first request information is used to request the second network device to switch a standby calendar to an active calendar;
sending a second FlexE overhead frame to the first network device, wherein the second FlexE overhead frame comprises first indication information that indicates that the second FlexE overhead frame is not a response to the first request information; and
receiving a third FlexE overhead frame sent by the first network device, wherein the third FlexE overhead frame comprises second request information, and the second request information is used to request the second network device to switch the standby calendar to the active calendar.

10. The method according to claim 9, wherein the first request information is a request packet carried over a management channel of the first FlexE overhead frame.

11. The method according to claim 9, wherein the first indication information is information indicated by a management channel of the second FlexE overhead frame, and the management channel of the second FlexE overhead frame does not carry a first response packet, wherein the first response packet indicates that the second FlexE overhead frame is a response to the first request information.

12. The method according to claim 9, wherein the first indication information is information indicated by a first field in the second FlexE overhead frame, and the first field is different from a calendar switch acknowledgment (CA) field in the second FlexE overhead frame.

13. The method according to claim 9, wherein the first indication information is information indicated by a calendar switch acknowledgment (CA) field in the second FlexE overhead frame, the first indication information indicates that the second FlexE overhead frame is not a response to the first request information, and the first indication information is not used to indicate a calendar.

14. The method according to claim 9, wherein the method further comprises:
sending a fourth FlexE overhead frame to the first network device, wherein
the fourth FlexE overhead frame carries second indication information that indicates that the fourth FlexE overhead frame is a response to the second request information.

15. The method according to claim 14, wherein the second indication information is information indicated by a management channel of the fourth FlexE overhead frame, the management channel of the fourth FlexE overhead frame carries a second response packet, and the second response packet is used to indicate that the fourth FlexE overhead frame is the response to the second request information.

16. The method according to claim 14, wherein the second indication information is information indicated by a calendar switch acknowledgment (CA) field in the fourth FlexE overhead frame, the second indication information is used to indicate that the fourth FlexE overhead frame is the response to the second request information, and the second indication information is not used to indicate a calendar.

17. A first network device, comprising:
a communication interface; and
a processor connected to the communication interface, wherein by using the communication interface and the processor, the first network device is configured to perform a method comprising:
sending a first flexible Ethernet (FlexE) overhead frame to a second network device, wherein the first FlexE overhead frame comprises first request information, and the first request information is used to request the second network device to switch a standby calendar to an active calendar;
receiving a second FlexE overhead frame sent by the second network device, wherein the second FlexE overhead frame comprises a first indication information that indicates that the second FlexE overhead frame is not a response to the first request information; and
sending a third FlexE overhead frame to the second network device, wherein the third FlexE overhead frame comprises second request information, and the second request information is used to request the second network device to switch the standby calendar to the active calendar.

18. The first network device according to claim 17, wherein the first request information is a request packet carried over a management channel of the first FlexE overhead frame.

19. The first network device according to claim 17, wherein the first indication information is information indicated by a management channel of the second FlexE overhead frame, and the management channel of the second FlexE overhead frame does not carry a first response packet, wherein the first response packet indicates that the second FlexE overhead frame is a response to the first request information.

20. The first network device according to claim 17, wherein the first indication information is information indicated by a first field in the second FlexE overhead frame, and the first field is different from a calendar switch acknowledgment (CA) field in the second FlexE overhead frame.

21. The first network device according to claim 17, wherein the first indication information is information indicated by a calendar switch acknowledgment (CA) field in the second FlexE overhead frame, the first indication information indicates that the second FlexE overhead frame is not a response to the first request information, and the first indication information is not used to indicate a calendar.

22. The first network device according to claim 17, wherein the method further comprises:
receiving a fourth FlexE overhead frame sent by the second network device, wherein the fourth FlexE overhead frame comprises a second indication information that indicates that the fourth FlexE overhead frame is a response to the second request information.

23. The first network device according to claim 22, wherein the second indication information is information indicated by a management channel of the fourth FlexE overhead frame, the management channel of the fourth FlexE overhead frame carries a second response packet, and the second response packet is used to indicate that the fourth FlexE overhead frame is the response to the second request information.

24. The first network device according to claim 22, wherein the second indication information is information indicated by a calendar switch acknowledgment (CA) field in the fourth FlexE overhead frame, the second indication information is used to indicate that the fourth FlexE overhead frame is the response to the second request information, and the second indication information is not used to indicate a calendar.

25. A second network device, comprising:
a communication interface device; and
a processor connected to the communication interface device, wherein by using the communication interface device and the processor, the second network device is configured to perform a method comprising:
receiving a first flexible Ethernet (FlexE) overhead frame sent by a first network device, wherein the first FlexE overhead frame comprises first request information, and the first request information is used to request the second network device to switch a standby calendar to an active calendar;
sending a second FlexE overhead frame to the first network device, wherein the second FlexE overhead frame comprises first indication information that indicates that the second FlexE overhead frame is not a response to the first request information; and
receiving a third FlexE overhead frame sent by the first network device, wherein the third FlexE overhead frame comprises second request information, and the second request information is used to request the second network device to switch the standby calendar to the active calendar.

26. The second network device according to claim 25, wherein the first request information is a request packet carried over a management channel of the first FlexE overhead frame.

27. The second network device according to claim 25, wherein the first indication information is information indicated by a management channel of the second FlexE overhead frame, and the management channel of the second FlexE overhead frame does not carry a first response packet, wherein the first response packet is used to indicate that the second FlexE overhead frame is a response to the first request information.

28. The second network device according to claim 25, wherein the first indication information is information indicated by a first field in the second FlexE overhead frame, and the first field is different from a calendar switch acknowledgment (CA) field in the second FlexE overhead frame.

29. The second network device according to claim 25, wherein the first indication information is information indicated by a calendar switch acknowledgment (CA) field in the second FlexE overhead frame, the first indication information indicates that the second FlexE overhead frame is not a response to the first request information, and the first indication information is not used to indicate a calendar.

30. The second network device according to claim 25, wherein the method further comprises:
sending a fourth FlexE overhead frame to the first network device, wherein
the fourth FlexE overhead frame comprises a second indication information that indicates that the fourth FlexE overhead frame is a response to the second request information.

* * * * *

UNITED STATES PATENT AND TRADEMARK OFFICE
CERTIFICATE OF CORRECTION

PATENT NO. : 12,047,165 B2
APPLICATION NO. : 17/692810
DATED : July 23, 2024
INVENTOR(S) : Ke Yi et al.

Page 1 of 1

It is certified that error appears in the above-identified patent and that said Letters Patent is hereby corrected as shown below:

On the Title Page

In item (56), in Column 2, under "Other Publications", Line 2, delete "202—2020" and insert -- 2020—2020 --.

Signed and Sealed this
First Day of October, 2024

Katherine Kelly Vidal
*Director of the United States Patent and Trademark Office*